United States Patent [19]
West, Jr.

[11] Patent Number: 5,014,309
[45] Date of Patent: May 7, 1991

[54] OFF-PREMISES CABLE TELEVISION CHANNEL INTERDICTION METHOD AND APPARATUS

[75] Inventor: Lamar E. West, Jr., Maysville, Ga.

[73] Assignee: Scientific-Atlanta, Inc., Atlanta, Ga.

[21] Appl. No.: 279,619

[22] Filed: Dec. 5, 1988

Related U.S. Application Data

[63] Continuation-in-part of Ser. No. 166,302, Mar. 10, 1988, Pat. No. 4,912,760.

[51] Int. Cl.⁵ ............................................. H04N 7/167
[52] U.S. Cl. .......................................... 380/7; 380/20; 455/1
[58] Field of Search ...................... 380/6, 7, 20; 455/1

[56] References Cited

U.S. PATENT DOCUMENTS

| Re. 29,997 | 5/1979 | den Toonder . |
|---|---|---|
| 3,202,758 | 8/1965 | Brownstein . |
| 3,760,097 | 9/1973 | Burroughs et al. . |
| 3,896,262 | 7/1975 | Hudspeth et al. . |
| 3,899,633 | 8/1975 | Sorenson et al. . |
| 3,989,887 | 11/1976 | Murphy . |
| 4,039,954 | 8/1977 | den Toodner . |
| 4,074,311 | 2/1978 | Tanner et al. . |
| 4,085,422 | 4/1978 | Niwata et al. . |
| 4,091,413 | 5/1978 | Herman ................................. 380/7 |
| 4,097,894 | 6/1978 | Tanner et al. . |
| 4,148,064 | 4/1979 | Reed . |
| 4,222,067 | 9/1980 | Stern et al. . |

(List continued on next page.)

FOREIGN PATENT DOCUMENTS

| 178758 | 4/1986 | European Pat. Off. . |
|---|---|---|
| 360778 | 9/1989 | European Pat. Off. . |
| 58-221577 | 12/1983 | Japan . |
| 59-61384 | 4/1984 | Japan . |

OTHER PUBLICATIONS

"TGT-The Affordable Solution" (article), AM Cable TV Industries, Inc.

"Addressable Tap IT-1-SM" (article), Control Com Inc.

"Tier Guard" (article), E-Com Corporation.

Primary Examiner—Linda J. Wallace
Attorney, Agent, or Firm—Banner, Birch, McKie & Beckett

[57] ABSTRACT

An off-premises cable television interdiction apparatus provides a microprocessor controller for controlling and switching one or more variable frequency voltage controlled oscillators. The variable frequency oscillators selectively jam only unauthorized premium programming transmitted on particular channels of a broadband signal in the clear from a headend to a subscriber. The microprocessor controller controls the variable frequency oscillators to hop between jamming frequencies and jam particular channels under control from the headend. A frequency calibration routine is executed periodically upon power-up to determine gain parameters for the oscillators. A heterodyned variable frequency oscillator may be provided for the interdiction system which moves the frequency of the variable frequency oscillator out of the television band and mixes the variable frequency oscillator output with a fixed local oscillator output to provide a jamming signal that falls in the television band. Gain control using a heterodyned oscillator may instead be provided for use in the interdiction system which uses one channel of the broadband signal as the jamming signal. Automatic gain control may also instead be provided for controlling the attenuation of a variable attenuator in accordance with a gain function determined by interpolation and previously stored in memory by a calibration routine executed periodically or upon power-up. The calibration routine may run concurrently with a frequency calibration routine for controlling the frequency of the jamming signal.

76 Claims, 10 Drawing Sheets

| U.S. PATENT DOCUMENTS | | |
|---|---|---|
| 4,317,213 | 2/1982 | DiLorenzo . |
| 4,326,289 | 4/1982 | Dickinson . |
| 4,334,322 | 6/1982 | Clark, III . |
| 4,342,119 | 7/1982 | Seidl . |
| 4,343,042 | 8/1982 | Shrock et al. . |
| 4,367,557 | 1/1983 | Stern et al. . |
| 4,434,436 | 2/1984 | Kleykamp et al. . |
| 4,450,481 | 5/1984 | Dickinson . |
| 4,498,193 | 5/1985 | Richardson . |
| 4,521,809 | 6/1985 | Bingham et al. . |
| 4,636,852 | 1/1987 | Farmer . |
| 4,651,204 | 3/1987 | Uemura . |
| 4,673,976 | 6/1987 | Wreford-Howard . |
| 4,682,359 | 7/1987 | Mistry . |
| 4,684,980 | 8/1987 | Rast et al. . |
| 4,686,564 | 8/1987 | Masuko et al. . |
| 4,691,353 | 9/1987 | Farmer . |
| 4,710,956 | 12/1987 | Rast . |
| 4,737,990 | 4/1988 | Kaneko . |
| 4,748,667 | 5/1988 | Farmer et al. . |
| 4,754,426 | 6/1988 | Rast et al. . |
| 4,769,745 | 3/1982 | Saeki et al. . |
| 4,769,838 | 9/1988 | Hasegawa . |
| 4,792,971 | 12/1988 | Uemura . |
| 4,825,467 | 4/1989 | Rist et al. . |
| 4,825,468 | 4/1989 | Ellis .......... 380/7 |
| 4,837,820 | 6/1989 | Bellavia, Jr. .......... 380/7 |
| 4,841,569 | 6/1989 | Wachob . |
| 4,903,297 | 2/1990 | Rist et al. . |
| 4,910,791 | 3/1990 | Dickinson et al. . |
| 4,914,695 | 4/1990 | Martin . |

OFF-PREMISES CABLE TELEVISION CHANNEL INTERDICTION METHOD AND APPARATUS

CROSS-REFERENCE TO RELATED APPLICATION

This application is a continuation-in-part of U.S. Ser. No. 166,302, now U.S. Pat. No. 4,912,760, filed Mar. 10, 1988 and entitled "Off-Premises Cable Television Channel Interdiction Method and Apparatus."

BACKGROUND OF THE INVENTION

1. Technical Field

This invention relates to cable television systems and, more particularly, a method and apparatus for applying remotely controlled and remotely applied interdiction or jamming signals to prevent reception of unauthorized television channels.

2. Description of the Prior Art

At a headend of a cable television system, a scrambler is normally provided to encode premium television channels. The applied scrambling precludes reception by an unauthorized converter/decoder at a connected premises. Data representing channels or tiers of programming are addressably transmitted to a particular converter/decoder and stored in an authorization memory. As a result of the addressed transmission, a subsequently transmitted program is authorized in that the decoder portion of the converter/decoder will be selectively enabled to decode the scrambled premium channel or program.

Several varieties of scrambling techniques are applied today. Each manufacturer has its own scheme which may be incompatible with others. Nevertheless, most popular scrambling systems today are based on sync suppression, in which the sync information is hidden from the television receiver's sync separator, usually by moving it to a level occupied by picture information (moving the sync tip to an equivalent picture level of 40 IRE units is common). Some systems modulate the picture carrier with a sine wave phased to suppress the horizontal blanking interval. Most systems today switch to the suppressed level at the beginning of the blanking interval and switch out at the end. Most though not all suppress the vertical blanking interval. Some systems dynamically invert the video, either on a line-by-line or a field-by-field basis. This must be done carefully to avoid artifacts caused by inverting and reinverting around different levels, and by differential gain and phase of the system. Synchronization is restored either by the provision of synchronous amplitude modulated pulses on the sound carrier, by digital information placed in the vertical interval or by phase modulation on the picture carrier.

The provision of one scrambler per premium channel at the headend and the inclusion of a descrambler in each converter/decoder at the premises of the television receiver is particularly expensive. Furthermore, providing the converter/decoder on premises has turned out to be a great temptation to service pirates who imaginatively seek ways to receive premium channels. As a result, cable television equipment manufacturers have entered into a vertiable war with such pirates resulting in complicated service authorization protocols in some instances involving multiple layers of encryption by both in-band and out-of-band data transmission further increasing the costs of the converter/decoder.

Furthermore, all scrambling systems leave artifacts in the horizontal blanking interval in the form of steps on the front and back porches. Normally these are not a problem, but if a television receiver does not have adequate overscan, then the steps can show up as light bars on one or both sides of the picture. Further, if a television receiver uses back porch sampling for automatic gain control and/or black level restoration, and the sampling period extends into the time of the descrambling step, the television will show the wrong black level and may show flicker in the picture. In systems in which pulse trains are applied to the sound carrier, a buzz carried by harmonics of a 59.94 Hz signal can be noticed in some television receivers.

Consequently, the cable industry has resorted to look for new technology and to take a second look at technology developed in the early stages of development of cable television such as the application of negative and positive traps and more recent techniques such as interdiction.

Negative trap technology is viewed by many manufactures as a viable alternative to sync suppression scrambling methods. A negative trap is basically a narrow band reject filter. Traps are located at the drop to a subscriber's dwelling and attenuate a significant portion of a premium television channel rendering that channel unusable by the subscriber.

In the conventional embodiment, negative traps are made using L-C filter techniques. The result is a notch with finite quality Q and finite shape factor. In the case of a single channel negative trap, the center of the notch is usually located at the picture carrier frequency of the channel to be removed. This technique, sometimes called a static negative trap, requires attenuation at the picture carrier of at least 60 dB to be effective.

Negative trap systems have several advantages that make them attractive for cable television applications. One primary advantage is the ability to deliver a broadband cable television spectrum to the subscriber's converter/decoder. Conventional sync suppression systems utilize descrambling set-top converter/decoders which deliver inherently narrowband signals. Negative traps are usually mounted outside the subscriber's home (typically at the tap) and thereby minimize the exposure associated with placing hardware inside the subscriber's dwelling. Finally, some cable television operators view the negative trap as a more secure means of subscriber control than is sync suppression, as picture reconstruction is viewed as substantially more difficult.

However, the negative trap system requires hardware in locations where no revenue is generated for the cable television system. Moreover, negative traps have several severe practical limitations. L-C band reject filters have Q and shape factor limitations. Quality factors Q for L-C filters are typically limited to less than 30. This means that for a negative trap located at channel 8 (picture carrier at 181.25 MHz) the 3 dB bandwidth of a negative trap is typically 6 MHz (or the bandwidth of a baseband television channel). This trap would result in significant deterioration of the lower adjacent channel. Then the television receiver tuned to the lower adjacent channel, rather than having to contend with a 15 dB picture-to-sound ratio, may have to contend with a sound carrier reduced an additional 6 dB or so. Frequency stability as a function of time and temperature is also a significant concern. Many cable television system operators have instituted a regular negative trap change-out program based on the assumption that after a certain period of time and temperature cycling, frequency drift will render negative traps useless.

Cascadability is another significant concern. Finite return loss and non-zero insertion loss limit the number of single channel negative traps which can be cascaded. As the number of services to be secured increases, the negative trap decreases in appeal. Moreover, a change in a channel line-up requires a significant investment in hardware and manpower in this scenario.

Recently, a new type of negative trap has been introduced. The dynamic negative trap consists of a notch filter that is designed to be modulated with respect to frequency. The notch is centered about the picture carrier but is deviated slightly from side to side. The television channel is rendered unuseable by the introduction of unwanted amplitude and phase modulation on the picture carrier. This technique requires a notch depth significantly less than that of static negative traps (typically 40 dB). Additionally, the intentionally introduced frequency modulation reduces somewhat the requirement for frequency stability.

The dynamic negative trap, however, has several disadvantages. A power source is required in order to accomplish the frequency modulation. More significant is the parasitic modulation that this technique produces on the adjacent television channels.

Positive trap systems also utilize a narrow band-rejection notch filter. However, unlike negative trap systems which are used to attenuate or trap a premium channel transmission, the notch filter is used to restore the premium television channel. In this scenario, an interfering signal is placed inside the premium television channel at the cable television headend. This interfering signal is then removed at the subscriber's dwelling by use of the notch filter. Ideally this notch filter removes only the interference without removing a significant amount of television information.

The positive trap technique is seen as having several advantages by the cable television system operator. It is considered advantageous to have the interference present in the secured channels on the cable television distribution plant (unlike the negative trap system in which the channels to be secured are "in the clear" on the distribution plant). It is very attractive from a financial standpoint to require subscriber hardware only at those locations where a subscriber wishes to receive a secure service. Thus, any capital investment is associated with a point of revenue generation.

The conventional embodiment of the positive trap system utilizes L-C notch filters to remove the interfering signal. These L-C notch filters suffer from the same limitations as do L-C negative traps discussed above. Consequently, L-C based positive traps are limited to the lower end of the cable television spectrum. Quality Q and shape factors have also restricted the number of locations for the interfering signal within the television channel.

The location for the interfering signal in the conventional embodiment of the positive trap system is midway between the picture carrier and sound carrier. The energy density (and hence information density) in this area of the spectrum is relatively low. One reason this location was chosen was that it minimized the impact of any television information removed along with the interfering signal by the notch filter, and thereby improved the quality of the recovered television signal. It would be expected that the jamming carrier would normally have minimal effect on the adjacent channel television picture unless a television has unusually poor rejection 2.25 MHz above the picture carrier. The jammer does add another carrier which the tuner will have to contend with, which might cause some degradation in a marginally overloaded case.

Despite this location, the quality Q and shape factor limitations of conventional L-C positive traps do remove a significant amount of useful television information. The result is a noticeable "softening" of the television picture as a result of attenuation of high frequency information. Predistortion at the headend can improve this performance but falls far short of being able to correct it completely. This location for the interfering signal also facilitates the job of the video pirate. This pirate can easily tolerate a degraded signal and hence can recover a useable picture using techniques easily available (such as the classic twin lead quarter wave stub with an aluminum foil slider for the fine tuning). Also, positive trap systems require a higher per premium channel cost than a negative trap system.

Parallel to developments of different types of trapping or jamming systems, the cable industry has also evidenced a requirement to move a converter or descrambler outside of a subscriber's home to a location which is more secure from signal piracy. For example, an addressable tap system was developed by Scientific Atlanta in 1983 or 1984 in which an off-premises "tap", addressed by a headband control system, gates a premium channel into the subscriber's premises. However, such products did not prove to be viable alternatives to inside-the-home signal descrambler/converters.

A relatively recent technique for premium channel control is the interdiction system, so-called because of the introduction of an interfering signal at the subscriber's location. Most embodiments consist of a pole-mounted enclosure located outside the subscriber's premises designed to serve four or more subscribers. This enclosure contains at least one microprocessor controlled oscillator and switch control electronics to secure several television channels. Control is accomplished by injecting an interfering or jamming signal into unauthorized channels from this pole-mounted enclosure.

For efficiency's sake, it is known to utilize one oscillator to jam several premium television channels. This technique not only reduces the amount of hardware required, but also maximizes the system flexibility. The oscillator output jamming signal frequency is periodically moved from channel to channel. Consequently, the oscillator is frequency agile and hops from jamming one premium channel frequency to the next.

One such system is known from U.S. Pat. No. 4,450,481 in which a single frequency agile oscillator provides a hopping gain-controlled jamming signal output to four high frequency electronic switches. In this known system, each switch is associated with one subscriber drop. Under microprocessor control and depending on which subscribers are authorized to receive transmitted premium programming, the microprocessor selectively gates the jamming signal output of the single oscillator via the switches into the path of the incoming broadband television signal to each subscriber. Consequently, an unauthorized subscriber upon tuning to a premium channel will receive the premium channel on which a jamming signal at approximately the same frequency has been superimposed.

In the known system, it is indicated that sixteen channels may be jammed by a single voltage controlled frequency agile oscillator. With respect to one premium channel, this translates to a situation in which the jamming signal can only be present one sixteenth of the time or an approximately 6% jamming interval. The rate of hopping is also indicated at 100 bursts per second of jamming signal at a particular frequency or a 100 hertz hopping rate. Consequently, the effectiveness of the jamming signal is questionable.

Cable television channels and, of course, premium service may extend over a wide range of frequencies, for example, from 100 to 350 megahertz. In the known system, the single oscillator provided must be frequency agile over a wide range. It is further recognized that the jamming signal output of the single oscillator must be within a range of 100-500 KHz above or below the video carrier frequency. Consequently, a synthesizer having an internal reference is provided to assure the reasonable accuracy of the jamming signal output of the oscillator to a tolerable 100-500 KHz band above or below the video carrier.

It is indicated that the jamming signal is at a high relative power and is gain controlled to exceed the amplitude of the video carrier by 5 to 20 dB. Because of the high output power relative to the premium channel video carrier power and the difficulty of precisely jamming the premium channel frequency, such an interdiction system leaves considerable opportunity for improvement. Because the oscillator is frequency hopping, its spectrum tends to spread out around the picture carrier, generating a slightly different situation as far as the required adjacent channel rejection characteristics of the television signal are concerned.

Jamming oscillators usually operate near the picture carrier frequency of the television signal and preferably at an amplitude near the amplitude of the television signal. Should the amplitude of a jamming oscillator be too low with respect to the amplitude of the picture carrier, inadequate jamming of the channel may occur resulting in a recoverable picture by the subscriber. On the other hand, should the amplitude of a jamming oscillator be too high with respect to the amplitude of the picture carrier, artifacts may be generated in unsecured adjacent television channels. Such is also the case when the frequency of a jamming oscillator varies from the picture carrier frequency of a channel to be jammed.

It is important that an interdiction system jamming signal frequency be placed as close as possible to the picture carrier frequency. Otherwise, adjacent channel artifacts or incomplete jamming will result. In the known system, the jamming signal is intentionally placed below the video carrier and consequently approximate to an adjacent channel producing adjacent channel artifacts.

It is also important that a variable frequency oscillator in an interdiction system hop between frequencies quickly and accurately with little harmonic frequency effects. Otherwise, adjacent channel artifacts or incomplete jamming will result. Furthermore, by using only one jamming oscillator only a limited, small number of channels may be jammed. The known system uses a conventional voltage controlled oscillator controlled by conventional frequency control techniques. Furthermore, in the known system, a maximum six percent jamming interval results when sixteen premium channels are jammed by the single oscillator at a relatively slow rate of frequency hopping. In such a system, the result depth of jamming for an unauthorized premium channel is unsatisfactory.

Additionally, it is important in an interdiction system that the jamming signal be properly matched in gain with the level of an interdicted channel. Furthermore, it is important that gain of a jamming oscillator match the level of an interdicted channel not only to compensate for drifts in the components due to temperature variations and seasonal weather changes but to compensate for level variations due to its location in a television distribution plant and to compensate for tilt due to imperfect gain requirements of a distribution cable over the frequency spectrum. Otherwise, adjacent channel artifacts or incomplete jamming will result. In the known system, conventional gain sensing and control circuits are used for gain control to compensate only for the simplest of variations.

Consequently, prior to the present invention, the need remained for an interdiction system capable of accurately jamming a broad spectrum of frequencies such that a large number channels may be jammed in a cost effective manner without the problems of harmonic effects, adjacent channel artifacts or incomplete jamming. The present invention solves the above-mentioned problems and provides an interdiction system with improved jamming oscillator designs, improved gain control techniques and improved frequency control techniques not heretofore possible.

SUMMARY OF THE INVENTION

It is an object of the present invention to provide an efficient, cost-effective interdiction system.

It is a further object of the present invention to provide a single jamming oscillator that can jam a large number of channels.

It is a further object of the present invention to provide improved gain control of oscillators for providing an interdiction signal.

It is a further object of the present invention to provide improved frequency control of oscillators for providing an interdiction signal.

It is a further object of the present invention to provide self frequency calibration for variable frequency oscillators.

It is a further object of the present invention to provide self attenuation calibration for a variable attenuator attenuating a jamming signal for a proper gain match with the broadband signal.

It is a further object of the present invention to provide a heterodyned jamming oscillator with a broad range of variable frequencies and with low harmonic frequency effects.

It is a further object of the present invention to provide a heterodyned jamming oscillator with gain control using a channel of the broadband signal as a basis for deriving a jamming signal having a proper gain match with the broadband signal.

An off-premises cable television interdiction system provides a microprocessor controller for controlling and switching one or more variable frequency voltage controlled oscillators. Each variable frequency oscillator selectively jams only unauthorized premium programming transmitted on particular channels of a broadband signal in the clear from a headend to a subscriber. The microprocessor controller controls the variable frequency oscillator to hop between jamming frequencies and jam particular channels under control from the headend. A frequency calibration routine is executed periodically upon power-up to determine gain parameters for each oscillator.

In accordance with the present invention, a heterodyned oscillator is provided for the interdiction system which moves the frequency of a variable oscillator out of the television band and mixes the variable oscillator output with a fixed local oscillator output to produce a jamming signal that falls in the television band. The heterodyning technique of this oscillator permits a single jamming oscillator to cover a much broader range of frequencies than a single non-heterodyned jamming oscillator. Besides the benefit of using a heterodyned jamming oscillator to cover a much broader range of frequencies than a non-heterodyned oscillator, another benefit derived from a heterodyned oscillator is that any harmonics of the jamming oscillator and harmonics of the fixed local oscillator exist far above the CATV band. Therefore, minimal filtering will be necessary to remove harmonic affects.

In accordance with a further embodiment of the invention, a heterodyned oscillator with gain control is provided for the interdiction system. This oscillator uses one channel of the broadband signal as the jamming signal. A better gain match is thus achieved between the jamming signal and the picture carrier. The one channel of the broadband signal used as a jamming signal is separated out by mixing in a mixer with a fixed frequency output of a local oscillator and by filtering in a bandpass filter. The separated out channel is then mixed with the output of one of the plurality of variable local oscillators for interdiction to jam a premium television channel on a broadband signal. The frequency of each variable local oscillator is adjusted to determine the channel jammed. The gain controlled heterodyned oscillator uses a filtered and mixed television channel to achieve a match between the jamming signal and the picture carrier thus effectively providing gain control. The filtered and mixed television signal automatically tracks variations in level of the incoming broadband signal. The gain control of the present invention eliminates the need for any automatic gain control circuits by mixing one of the channels of a broadband signal and using it as a jamming signal.

In accordance with a still further embodiment of the present invention, automatic gain control using a programmed microprocessor is provided for controlling the attenuation of a variable attenuator. The attenuation of a variable attenuator is controlled by the programmed microprocessor to attenuate the output of the jamming oscillator so that the oscillator output is matched with the magnitude of the incoming broadband signal and combined for output to the subscriber. This automatic gain control circuit senses the attenuated output of the jamming oscillator and the broadband signal input at both a low and high frequency using a low bandpass and a high bandpass filter. The attenuation of the output of the jamming oscillator is controlled as a function of the frequency output of the jamming oscillator in accordance with a stored gain function determined during an attenuation calibration mode. During the attenuation calibration mode, the attenuated output of the jamming oscillator is compared with the sensed broadband high and low frequency signals to determine the gain function by interpolation between the sensed high frequency and low frequency gains. The microprocessor used for frequency calibration may also be employed for gain calibration and control. Furthermore, control parameters can be downloaded to the microprocessor via an addressed command from the headend to control frequency or gain calibration or to preprogram the stored gain function.

The above-described types of gain control use the magnitude of the broadband input signal as a reference for adjusting the magnitude of the jamming signal so that the magnitude of the jamming signal can be perfectly matched to the magnitude of the broadband input signal for off-premises cable television interdiction. The above-described types of gain control may be applied together in the same system or in the alternative depending upon desired characteristics. Each is capable of compensating for drifts of the jamming oscillator gain with respect to the broadband signal magnitude caused by temperature variations or seasonal weather changes. Furthermore, either gain control type also automatically adjusts the gain of the jamming signal with respect to a broadband input signal strength when placed at any location in a television distribution plant.

These advantages and features of the present method and apparatus for providing the improved interdiction system for selectively jamming a plurality of channels on a broadband signal under control from the headend will now be explained in the following detailed description of the invention with reference to the drawings.

DETAILED DESCRIPTION OF THE INVENTION

Figure 1:
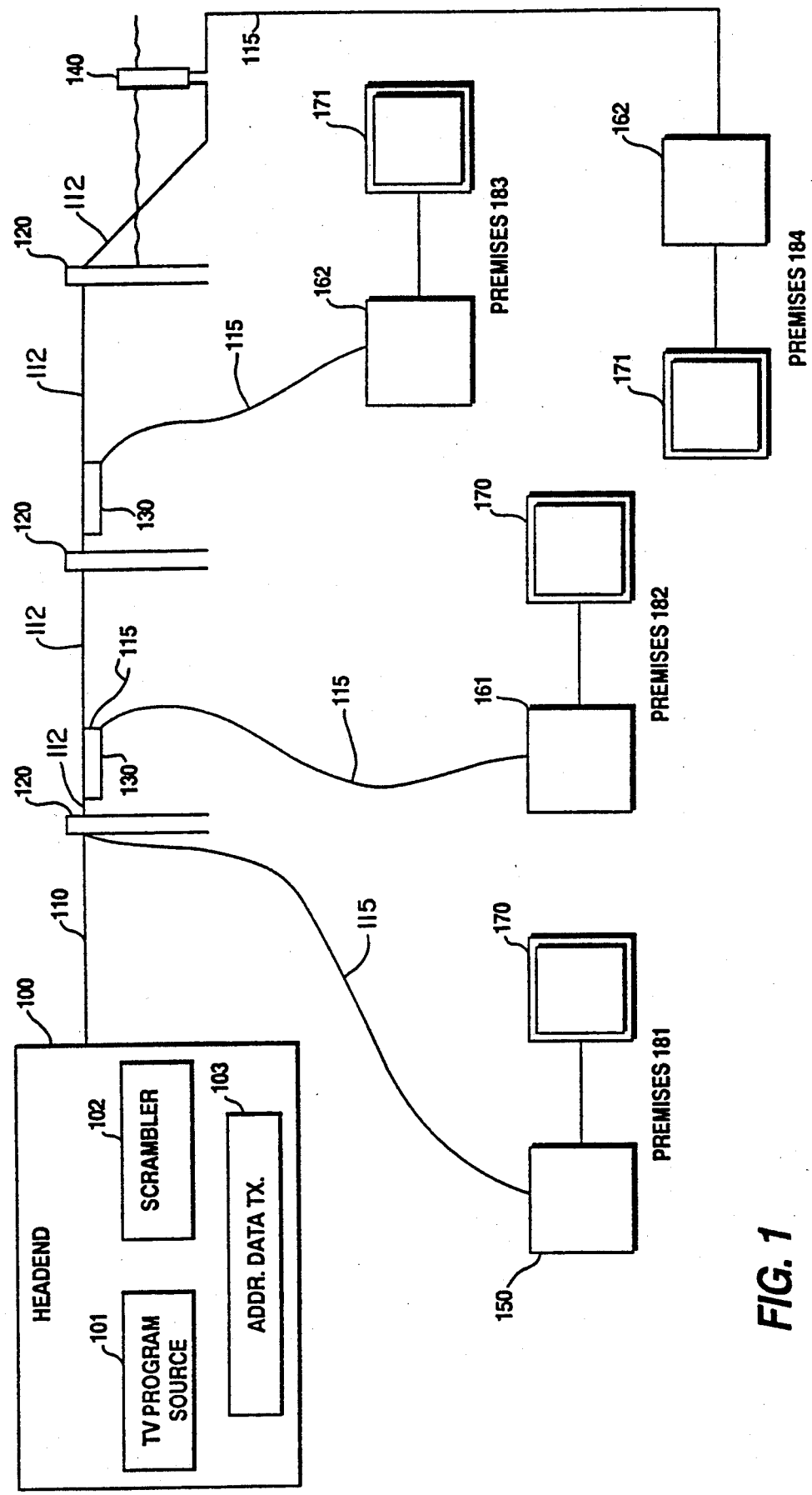
FIG. 1 is an overall system block diagram showing the inherent compatibility of the present interdiction apparatus with existent cable television systems comprising premium channel scramblers, addressable data transmitters, and subscriber converter/decoders.

Referring more particularly to FIG. 1, there is shown a general block diagram of a cable television system employing the principles of the present invention. By cable television system is intended all systems involving the transmission of television signals over a transmission medium (fiber optic cable or coaxial cable) toward remote locations. For example, a cable television system may comprise a community antenna television distribution system, a satellite signal distribution system, a broadcast television system, a private cable distribution network, either industrial or educational, or other forms of such systems. Each remote location of a television receiver may comprise the location of a particular subscriber to a subscription television service, plural subscribers, single subscribers having plural television receivers or private locations in a private cable distribution network. Consequently, the term subscriber, when used in this application and the claims, refers to either a private subscriber or a commerical user of the cable television system. Headend 100 as used in the present application and claims is defined as the connecting point to a serving cable or trunk 110 for distributing television channels over feeder line 112 to drop 115 and finally to subscriber locations. For reference purposes, an Electronic Industries Association (E.I.A.) standard cable television frequency allocation scheme is employed and referred to herein; however, by means of the following disclosure of the present invention, one may apply the principles to other known standards or non-standard frequency allocations. Furthermore, a National Television Subcommittee (N.T.S.C.) standard composite television signal at baseband is generally considered in the following description; however, the principles of the present invention apply equally to other standard and non-standard baseband television signal formats.

Headend 100 comprises a source of television programming 101. Television program source 101 may be a satellite television receiver output, a program produced by a television studio, program material received over a microwave or broadcast television link, a cable television link output, or any other source of television programming consistent with the present invention. The program source material need not be limited to conventional television but may comprise teletext, videotext, program audio, utility data, or other forms of communication to be delivered to a remote location over the serving cable or trunk line 110 and subsequently over feeder line 112 and drop line 115.

Conventionally, trunk line 110, feeder line 112, and drop line 115 are constructed of coaxial cable. For higher performance, any one of these lines could be a fiber optic cable. Preferably, due to the cost of the installation and the need for a high quality initial transmission from headend 100, trunk line 110 is typically the only line constructed of fiber optic cable.

Program material provided by source 101 may be premium or otherwise restricted or desirably secured from receipt at unauthorized receiver locations. To this end, each channel or program to be secured is generally scrambled by scrambler 102 provided at headend 100. By the use of the term premium channel or premium programming in the present application and claims is intended a channel or program which is desired to be secured from unauthorized recept either because of its premium or restricted status.

Normally, all premium programming in known cable television systems is scrambled. However, in accordance with the present invention, premium programming is transmitted in the clear, and interdiction is applied at off-premises interdiction apparatus 130 to jam reception of unauthorized premium programming.

Consequently, during a transition period in which headend 100 provides scrambled television programming as well as premium programming in the clear, a scrambler 102 will be provided so long as converter/decoders 150 are provided to subscribers for unscrambling scrambled program transmission. In certain instances, converter/decoders 150 may be entirely replaced by interdiction apparatus 130 of the present invention.

Also, at the headend, there is normally an addressable data transmitter 103 for transmitting global commands and data to all subscribers or addressed communications for reception by a unique subscriber. Such data transmission may be conducted over a separate data carrier from the cable television spectrum, for example, at 108.2 megahertz. It may also be transmitted over an unused default channel from the television spectrum. Global commands generally take the form of operation code and data while addressed communications further comprise the unique address of a particular subscriber.

In another alternative embodiment, such communications may take the form of in band signals sent with a television channel superimposed upon an audio carrier during, for example, the vertical interval of the video signal. Such data communications further complicate data reception at intervention apparatus 130 in accordance with the present invention and are desirably eliminated. However, in band signaling is sometimes required for the operation of certain converter/decoders 150 known in the art.

Consequently, headend 100, cable television serving cable or trunk line 110, and converter/decoders 150 and television receivers 170 at a typical subscriber premises 181 comprise a typical known cable television system. Channel program or authorization data is transmitted via an addressable data transmitter 103 over a trunk line 110 on feeder line 112. At a pole 120 or from a pedestal 140 at underground cable locations, the serving signal is dropped via drop 115 to a subscriber location. Drop 115 is connected to a conventional converter/decoder 150 which serves several functions. Responsive to an addressed communication from headend transmitter 103, channel or program authorization data is updated in an authorization memory if the address associated with the addressed communication matches a unique address of the subscriber decoder 150. For example, the subscriber address may comprise a plurality of bits over and above the actual number of subscribers in a system, additional bits insuring the security of the address. The premium channel or program is then stored in the authorization memory of the converter/decoder 150. Television programming is normally converted to an otherwise unused channel such as channel 3 or 4 of the television spectrum by a converter portion of converter/decoder 150. Its premium status is checked against the data stored in authorization memory. If the programming is authorized, the decoder portion of the converter/decoder is enabled to decode authorized scrambled premium programming.

The provided television receiver may be a conventional television receiver 170 or may be a so-called cable ready television receiver 171. Because of the advent of cable ready television receivers 171, there is no longer a requirement at a subscriber premises 181 for the converter portion of the converter/decoder 150 as a converter is built into such television receivers.

In accordance with a cable television system provided with interdiction apparatus 130 of the present invention, a housing is mounted on a strand supporting cable 112, to a pole 120, or provided via a pedestal 140. Inside the housing is common control circuitry for tapping into the broadband television and data transmission spectrum. Referring to the first pole 120 from the left of FIG. 1, there is shown a strand-mounted apparatus serving two drop 115 to subscribers. Altogether, four subscribers and up to four drops 115 may be served by interdiction apparatus 130. Besides the common control circuitry, four plug-in subscriber modules may be provided for one housing. Also, if desired, additional services may be provided via other plug-in units of the housing such as impulse pay-per-view, subscriber polling involving two-way data communication, meter reading, energy management or other services.

Desirably, all equipment 161 may be removed from the subscriber premises 182. However, for the provision of additional services, some on-premises equipment may be unavoidable. For purposes of this description, premises 182 will be assumed to include at least one non-cable ready conventional television receiver 170. Consequently, subscriber equipment 161 must at least comprise a tunable converter for converting a received cable television channel to an unused channel such as channel 3 or 4 for reception on conventional television receiver 170.

Power for interdiction apparatus 130 may be provided over the cable from the headend 100 or be provided via the subscriber drop 115 or by a combination of such means. Foreseeably, power may be even provided by rechargeable means such as solar cells or other external or replaceable internal sources such as batteries. Consequently, subscriber equipment 161 may also comprise a source of power for interdiction apparatus 130.

Interdiction apparatus 130 may be secured in a tamper-resistant housing or otherwise secured such as in a locked equipment closet of an apartment complex. If located in a place exposed to the elements, the housing should be water-tight. Also, the housing should be designed to preclude radio frequency leakage.

At premises 183, the subscriber is presumed to have a cable ready television receiver 171. Consequently, subscriber unit 162 may be entirely eliminated or comprise simply a power feed to interdiction apparatus 130.

Premises 184 pictorially represents a subscriber location served by an underground cable 110 via a plurality of pedestals 140, in which cable distribution amplification and branching equipment and drops 115 are normally provided. In accordance with the present invention, pedestal 140 may comprise an off-premises housing for interdiction apparatus 130. Subscriber equipment 162 may comprise a converter, an additional service device and a power unit as described in reference to subscriber equipment 161 or nothing at all as described in reference to subscriber equipment 162.

Interdiction apparatus 130 is uniquely addressable by headend 100 just as is converter/decoder 150. If two bits of a plural bit unique subscriber address are associated with uniquely identifying one plug-in slot for one of four subscriber modules, common control circuitry may be uniquely addressed with remaining address data not used to secure the data communication. Just as premium programming is transmitted in the clear and since no data communication is necessarily required with a subscriber premises, a subscriber address need not be transmitted in a secure form in accordance with the principles of the present invention. Nevertheless, address security may be desirable so long as converter/decoders 150 or other unique address requisite equipment is provided at a premises.

Interdiction apparatus 130 comprises addressable common control circuitry and up to four plug-in subscriber modules. Upon receipt of subscriber specific premium program or channel authorization data, the data are stored at interdiction apparatus 130. Interdiction apparatus 130 further may comprise automatic gain control circuitry of the common control circuitry. Alternative gain control arrangements will be described subsequently herein with reference to FIGS. 9 and 10. Channel interdiction circuitry associated with each subscriber module jams unauthorized premium programming dropped via a particular drop 115 to a particular subscriber. Consequently, interdiction apparatus 130 is reasonably compatible with addressable authorization data transmission known in the art. No scrambling of premium channels (and no resulting artifacts) is necessary or desirable. Furthermore, no additional forms of service security are necessary such as channel encryption, in-band channel or tier verification or other security measures. The would-be service pirate must attempt to remove a particular pseudo-randomly times jamming signal placed at a varying frequency or seek to tamper with the off-premises apparatus 130 or derive a signal from shielded and bonded cable 110 which should likewise be maintained secure from radio frequency leakage.

Figure 2:
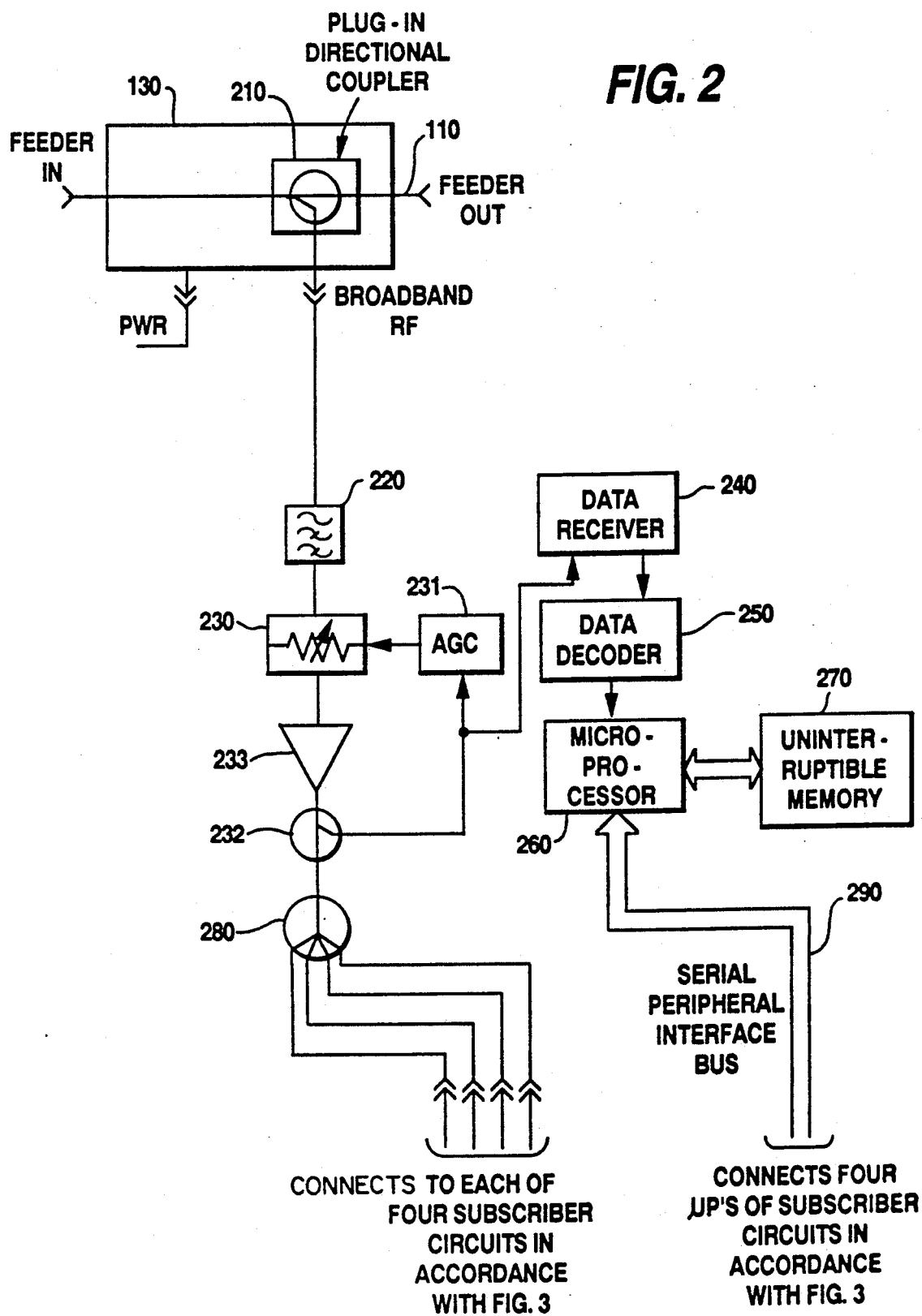
FIG. 2 is a block schematic diagram of an addressable common control circuit for the plurality of provided subscriber modules in accordance with the present invention comprising a broadband signal tap, a microprocessor, a data receiver and decoder and an automatic gain control circuit.

The common control circuitry of interdiction apparatus 130 will now be described by means of the block diagram FIG. 2 for serving four subscriber modules in accordance with the block diagram FIG. 3. Referring particularly to FIG. 2, a feeder cable 110 is shown entering interdiction apparatus 130 at FEEDER IN and leaving at FEEDER OUT. Power PWR may be provided via the feeder cable by means of a subscriber drop or locally by internal or external means. Depending on the source of power PWR, input power may be of alternating or direct current.

A directional coupler 210 which may be in the form of a plug-in module taps into the broadband serving cable 110. A broadband of radio frequency signals is thus output to highpass filter 220. Highpass filter 220 passes a band of frequencies comprising at least the data carrier frequency or frequencies (in a bi-directional application) and the cable television channel spectrum. Referring briefly to FIG. 4(b), the cable television spectrum may comprise a frequency band from about 54 MHz to 350 MHz.

A common automatic gain control circuit as disclosed in FIG. 2 comprises variable attenuator 230, RF amplifier 233, directional coupler 232, and AGC control circuit 231. This automatic gain control circuit appropriately regulates the broadband RF signal power to fall within established limits.

Also connected to directional coupler 232 is a data receiver 240 for receiving data from the addressable data transmitter 103 located at headend 100. Data receiver 240 receives data transmitted, for example, over a data carrier of 108.2 megahertz and provides unprocessed data to data decoder 250. In accordance with an established protocol, such data may be in the form of an operation code, a subscriber unique address and associated data. Data decoder 250 processes the data and provides the separately transmitted data to microprocessor 260 for further interpretation in accordance with a built-in algorithm. Microprocessor 260 is most efficiently chosen to alleviate as many responsibilities from any microprocessor provided for an individual subscriber module and so is most conveniently an eight bit microprocessor having eight kilobytes of internal code such as a Motorola 68HC05C8.

Received data may be stored in uninterruptable memory 270 by microprocessor 260. Data may be temporarily stored in memory 270 or more permanently stored and subsequently downloaded when needed to a subscriber module via a serial peripheral interface bus connecting microprocessor 260 with separate microprocessors associated with each provided subscriber module.

Microprocessor 260 consequently interprets both global communications addressed to common control circuitry or communications addressed to unique subscriber modules. If appropriate, microprocessor 260 ignores global or addressed communications to other interdiction apparatus 130 or to converter/decoders 150 (FIG. 1). Examples of global communications peculiar to interdiction apparatus 130 are premium channel frequency data and jamming factor data for each premium channel or channel over which premium programming at a particular point in time is provided via headend 100. Examples of addressed communications include communications comprising premium channel or programming authorization information or communications instructing the common control circuitry to deny or provide service to a particular subscriber.

If two way services over the serving cable are anticipated, a data transmitter (not shown) must be provided in the common control circuitry of FIG. 2 or a separate telephone link from the subscriber location to the headend may be provided. Serial peripheral interface bus 290 may be a two way communications link by way of which link microprocessors 300 (FIG. 3) associated with subscriber modules may, at least, provide status reports to microprocessor 260 upon inquiry.

Figure 4A:
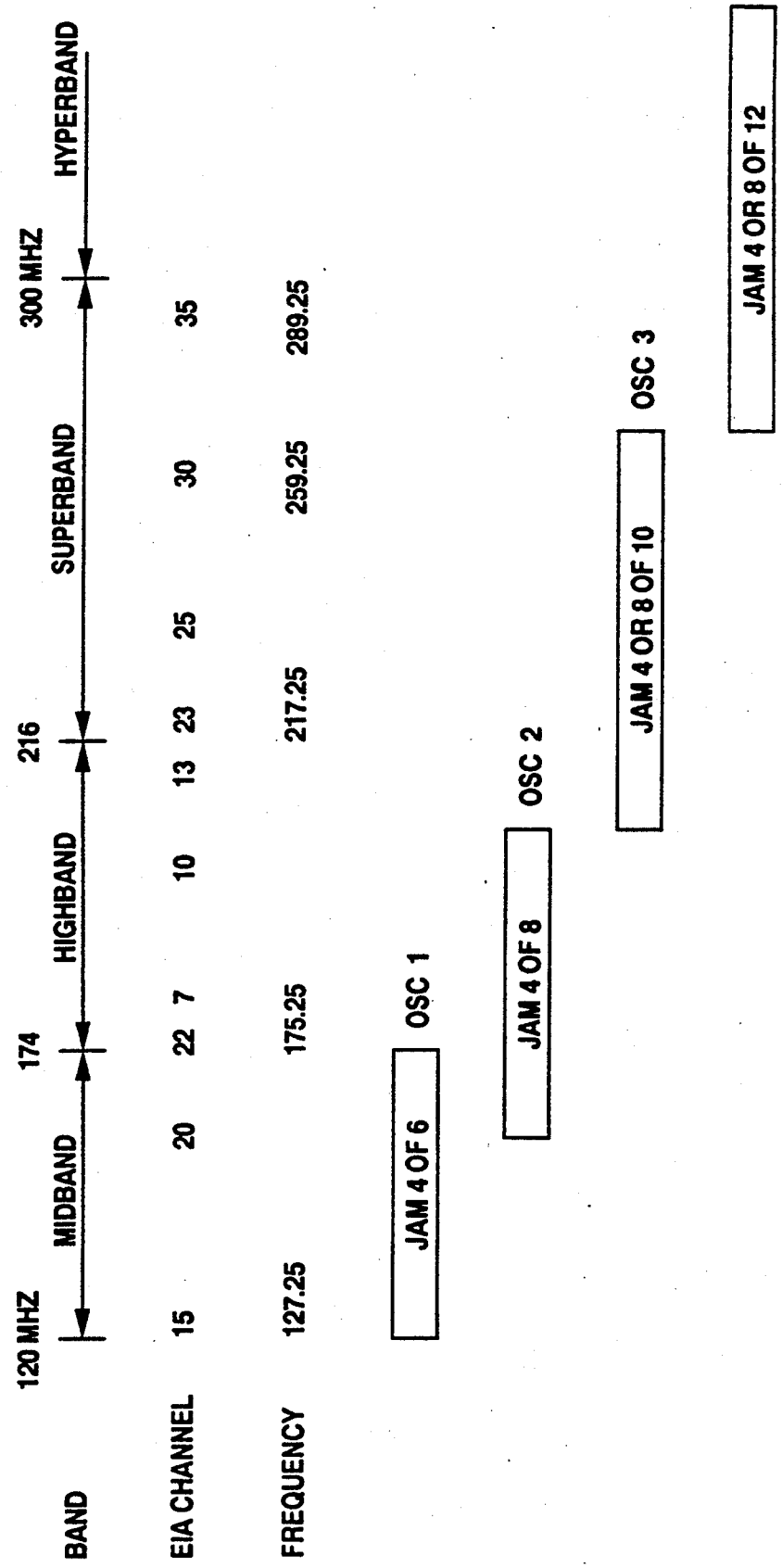
FIGS. 4(a) and 4(b) represent frequency plans for allocating the broadband cable television spectrum among four or five separate bands, each of which bands comprising a plurality of channels greater than or equal to four but, of which plurality, only four channels may be jammed at a 20% jamming interval.
Figure 4B:
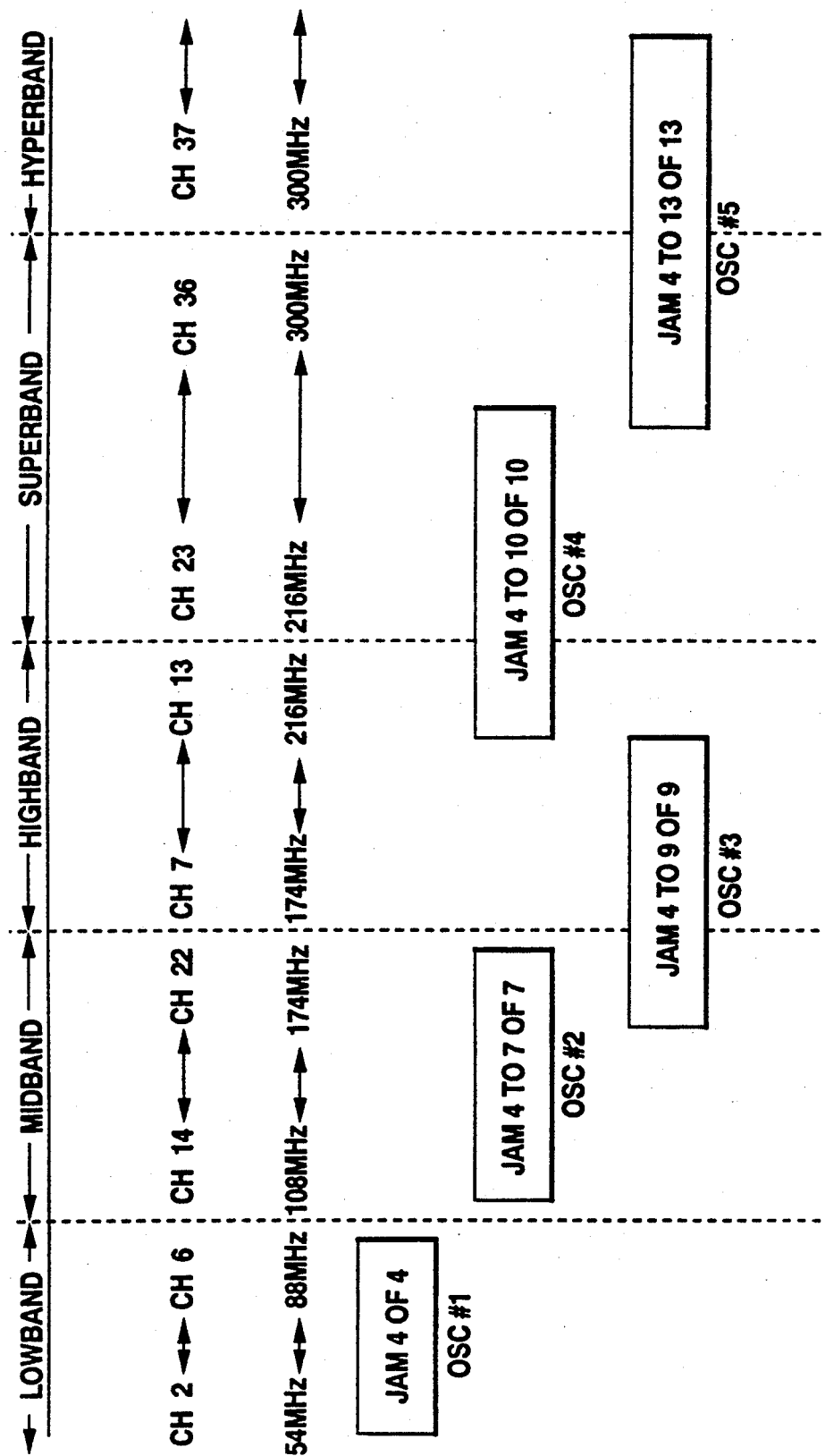

Radio frequency splitter 280 provides broadband radio frequency signals comprising at least the cable television service spectrum of FIGS. 4(a) and 4(b) separately to each subscriber module that is provided.

If a reverse path is required for special additional services, a signal combiner (not shown) of a plug-in special service module may be provided for receiving communications from each of the four subscriber modules in an opposite manner to splitter 280. Certain data may be transmitted back toward the headend via the special service plug-in module (also, not shown) associated with the additional special service.

Figure 3:
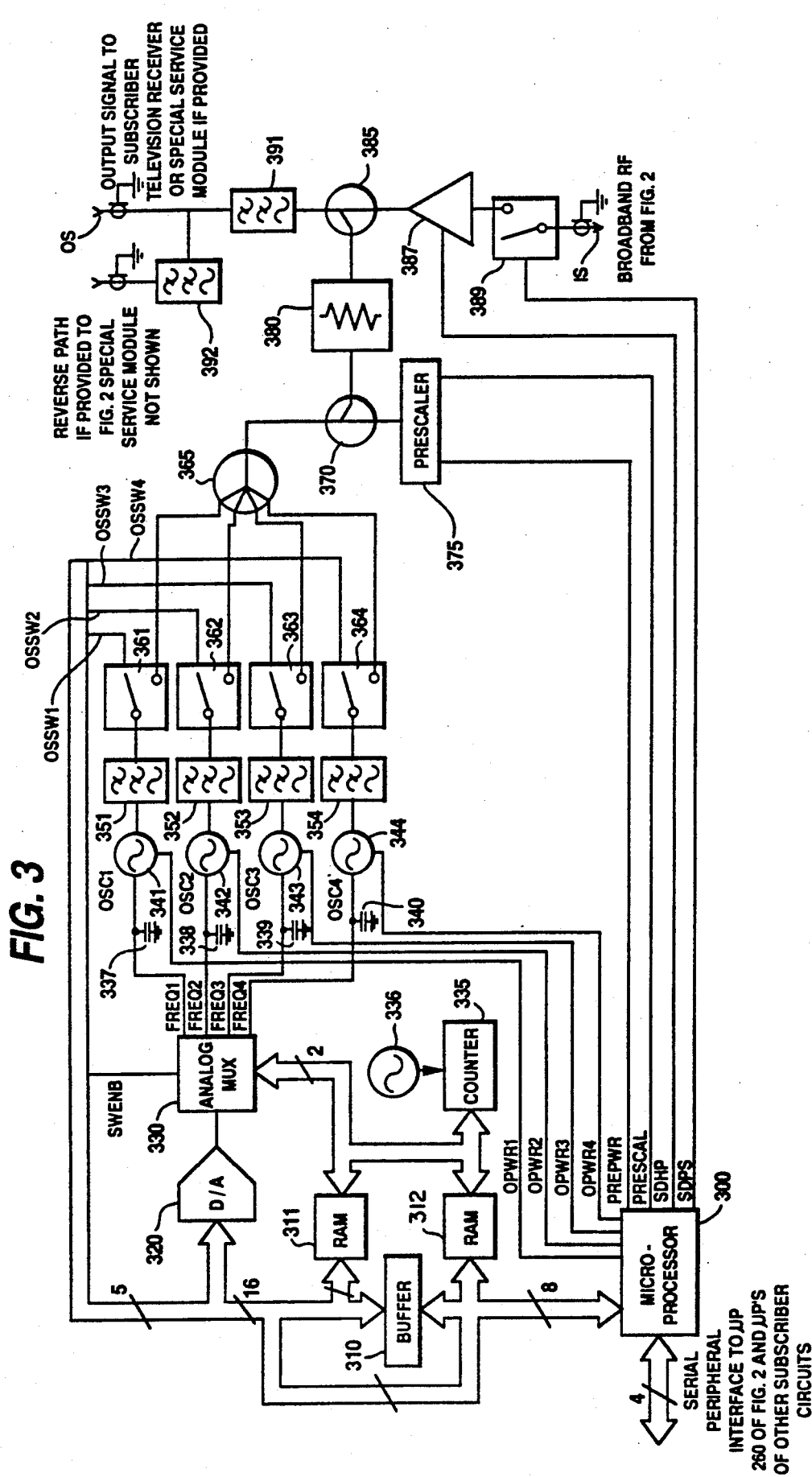
FIG. 3 is a block schematic diagram of one subscriber module comprising a microprocessor for selectively actuating and controlling the output frequency provided by each of four voltage controlled oscillators such that during a normal mode of operation sixteen premium channels may be jammed at a minimum twenty percent jamming interval and, during a calibration mode, a feedback path is provided to the microprocessor through a programmable prescaler to precisely establish jamming signal frequencies.

Referring more particularly to FIG. 3, there is shown an overall block schematic diagram of a subscriber module in accordance with the present invention. A microprocessor 300 is associated with a particular subscriber module and communicates with microprocessor 260 of FIG. 2 over a serial peripheral interface bus. Microprocessor 300 may comprise an eight bit microprocessor equipped with only two kilobytes of code, this microprocessor being relieved of overall control responsibilities by microprocessor 300. Consequently, microprocessor 300 may conveniently comprise a Motorola 68HC05C3 microprocessor or similar unit.

A reverse path may be provided via a lowpass filter 392 to a special service module (not shown in FIG. 2) of common control circuitry as described in FIG. 2 from a corresponding special service module on the subscriber premises. Such a reverse path is completed to the subscriber via terminal OS. Also, power may be transmitted up the subscriber drop to the module of FIG. 3 and withdrawn at terminal OS.

The broadband radio frequency television spectrum signal from FIG. 2 is provided to terminal IS. Referring to the path connecting terminal IS to terminal OS, there are connected in series a service denying switch 389, an amplifier 387, a jamming signal combiner 384, and a high pass filter 391. Service denying switch 389 is under control of microprocessor 300. In the event of an addressed communication from headend 100 indicating, for example, that a subscriber is to be denied service for non-payment of a bill, service denying switch 389 may be opened. In addition, a high frequency amplifier 387 may be powered down under control of microprocessor 387 whenever service is to be denied. Otherwise, amplifier 387 may be set at discrete gain levels, under microprocessor control, to provide supplemental gain to the broadband television signal if a subscriber has a plurality of television receivers over and above a nominal amount.

Jamming signals are interdicted at directional combiner 385 under microprocessor control. Because of the directional characteristic of amplifier 387, jamming signals cannot inadvertently reach the common control circuitry of FIG. 2 or the serving cable 110. Jamming signals are interdicted at a level approximately within a range of −2.5 db to +6.5 db or +2 dB nominal of the video carrier power level of the unauthorized premium channel frequency to be jammed. They are most conveniently interdicted for video carrier jamming approximately within a range of frequencies extending from the video carrier to +250 kilohertz above the video carrier toward the audio carrier of the channel to be jammed. In accordance with the present interdiction apparatus, the frequency is selectable by the headend 100 and so may be chosen to jam the audio carrier at a frequency closer to that carrier if desired. Also, the power level of the jamming signal may be varied via global data transmissions if, for example, audio carrier jamming is desired. Such interdiction on a per channel bais between the video and audio carriers minimizes adjacent channel artifacts.

Highpass filter 391 prevents any return path signals from reaching combiner 385 and passes the broadband spectrum including any jamming signals toward terminal OS. Reverse path signals, for example in this embodiment, if present, may be radio frequency signals below 100 megahertz. The broadband television spectrum is presumed to be in the 100–350 megahertz range consistent with FIG. 4. However, interdiction of premium channel viewing may be allocated anywhere desired within a broader or discontinuous cable television spectrum to be jammed. Consequently, filters 391 and 392 are designed in accordance with this or similarly selected design criteria to block or pass broadband television or reverse path signals as required.

Microprocessor 300 controls four (or five if necessary) voltage controlled oscillators 341-344, each of which oscillators jams premium channel frequencies within an allocated continuous range of frequencies. Since premium programming may be transmitted anywhere in the cable television spectrum, the sum of all such allocated portions comprises the entire television spectrum to be jammed (even where non-premium channels are normally transmitted). In accordance with the present invention, the television spectrum to be jammed may comprise discontinuous portions or intentionally overlapping portions.

Referring briefly to FIG. 4(a), the spectrum allocation to the plurality of four voltage controlled oscillators in one embodiment will be discussed in view of certain principles. Five voltage controlled oscillators can alternatively be used in another embodiment as shown in FIG. 4(b). In FIG. 4(b), a fifth low band oscillator may be provided if premium service is transmitted over normally non-premium channels such as channels 2-13. Firstly, with reference to FIG. 4(a), it is desirable to eliminate jamming signal harmonic interference to authorized channels within the allocated band. For example, a harmonic of a relatively low frequency signal, for example, 100 MHz can interfere with a channel at a harmonic of this frequency in the upper part of the cable television spectrum. In other words, the allocated band should be limited for an oscillator to fall within one third of an octave, and, consequently all frequency harmonics may be blocked by filters 351, 352, 353 and 354 associated with each oscillator. Oscillator 341 denoted OSC 1, for example, is active in a band extending from 126 to 158 megahertz while filter 351 will block harmonics above the included channels 15-20 of the midband.

Cable headend service providers tend to select premium channel allocations in the midband range covering channels 15-22. Consequently, the band of oscillator 342, for example, may be selected to overlap the band allocated to oscillator 341.

In order to achieve a jamming interval of 20%, each oscillator may be restricted to jamming only four premium channels. As will be described in connection with a discussion of FIGS. 5, 6, and 7, jamming depth may be automatically increased for a particular subscriber dependent upon the subscriber's level of service. Also, by allocating an overlap of bands as between first and second oscillators 341 and 342, for example, all eight channels of the midband may be jammed by means of the present interdiction apparatus leaving two channels of the highband which still may be jammed via oscillator 342. Consequently, according to FIG. 4, oscillator OSC1 may jam four of the six allocated channel frequencies of the midband while oscillator OSC2 may jam an overlapping band comprising channels 19-22 of the midband and channels 7-10 of the highband. The range of jamming signal frequencies for oscillator OSC2 is selected within the range of 150-194 megahertz consistent with the desirable elimination of harmonic interference.

Consistent with these design principles, no band overlap is shown for oscillator OSC3 or oscillator OSC4. Nevertheless, the respective frequency ranges of 198-254 megahertz and 258-326 megahertz of these oscillators eliminate any danger of harmonic interference. Low pass filters 353 and 354 cut off harmonic frequencies above the upper limits of these respective ranges. Oscillator OSC3 provides jamming signals for jamming four premium channels selected from channels 11-13 of the highband and channels 23-29 of the superband. Eight premium channels may be jammed at a reduced jamming factor of these ten channels. Oscillator OSC4 is provided for jamming from channel 30 in the superband to channel 41 extending into the hyperband. Four channels of these twelve may be jammed at a 20% jamming interval; however, eight may be jammed at a reduced jamming factor.

Additionally, the fifth oscillator may be desired to cover an additional band of normally non-premium channels such as lowband channels 2 through 6 from 54 MHz to 88 MHz. The lower frequency oscillator would be more limited as to the number of channels it could jam (4 of 4 channels) than the high frequency oscillator (4 to 13 of 13 channels). Alternatively, four oscillators can be used wherein only four of the five portions illustrated in FIG. 4(b) are selected. In any event, more than five oscillators is also clearly possible covering additional portions beyond those in FIG. 4(b) up to about 600 MHz.

Microprocessor 300 is connected by a bus system to memory and buffer circuits comprising RAM's 311 and 312 and buffer 310. Microprocessor 300 operates at a clock frequency of, for example, four megahertz provided by clock 336. Counter 335 is shown as a separate element; however, counter 335 is provided essentially for counting the output frequencies of jamming oscillators 341-344 during a frequency calibration mode of operation and so may comprise an element of microprocessor 300.

Microprocessor 300 is also connected to digital to analog converter 320. During a normal mode of operation, digital to analog converter 320 converts a ten bit voltage control word to analog voltage outputs which are, in turn, provided to analog multiplexer 330. The analog voltage outputs of the analog multiplexer 330 are stored and held at sample and hold circuits 337-340 for application to oscillators 341-344. Via a two bit parallel select bus, analog voltage signal outputs are periodically gated by analog multiplexer 330 over leads FREQ 1-4 toward the oscillators 341-344. In accordance with the principles of the present invention, these signals may be provided in a pseudorandom sequence to thwart pirating attempts as will be described in reference to FIG. 6.

Microprocessor 300 is connected to each oscillator 341-344 via respective oscillator power lines OPW-R1-4 for actuating the oscillators. Each oscillator may be powered down during a normal mode of operation if a subscriber is authorized to receive all channels within its allocated band at one point in time. Furthermore, during a calibration mode, one oscillator may be powered up for calibration while all other oscillators are powered down.

Microprocessor 300 is further connected to four high frequency PIN diode switches 361-364. During a normal mode of operation, these switches are selectively opened for a brief interval for, for example, sixteen microseconds while an associated oscillator changes or hops from one jamming signal frequency output to another. Nevertheless, assuming four channel jamming by a particular oscillator at a jam factor of four, a four thousand hertz frequency hopping rate is easily achievable via these PIN diode switches.

Also connected to the outputs of each oscillator are associated low pass filters which serve to cut off all harmonics of jamming signal frequency outputs. These low pass filters may be connected either to the inputs or to the outputs of switches 361-364 although connection in series between its associated oscillator and high frequency switch is shown in FIG. 3.

The jamming signal outputs of all four oscillators are combined at signal combiner 365. From signal combiner 365, the combined output is directionally coupled by coupler 370 to programmable prescaler 375 and to signal attenuator 380.

Programmable prescaler 375 is only powered via lead PREPWR when required during a calibration mode. In accordance with a programmable divide-by factor, a divided down output frequency is provided to microprocessor 300 for counting. When powered down, no output signal results.

During a normal mode of operation, the combined jamming signal output of attenuator 380 are combined at directional coupler 385 with the passed incoming broadband television signal from the common control circuit of FIG. 2. As the subscriber is presumed to have paid their bill, switch 389 and amplifier 387 are assumed to be powered. As a result of the combining of jamming signals with the broadband spectrum (thus far transmitted in the clear), the subscriber will only receive in the clear premium or restricted programming which the subscriber is authorized to receive.

Figure 5:
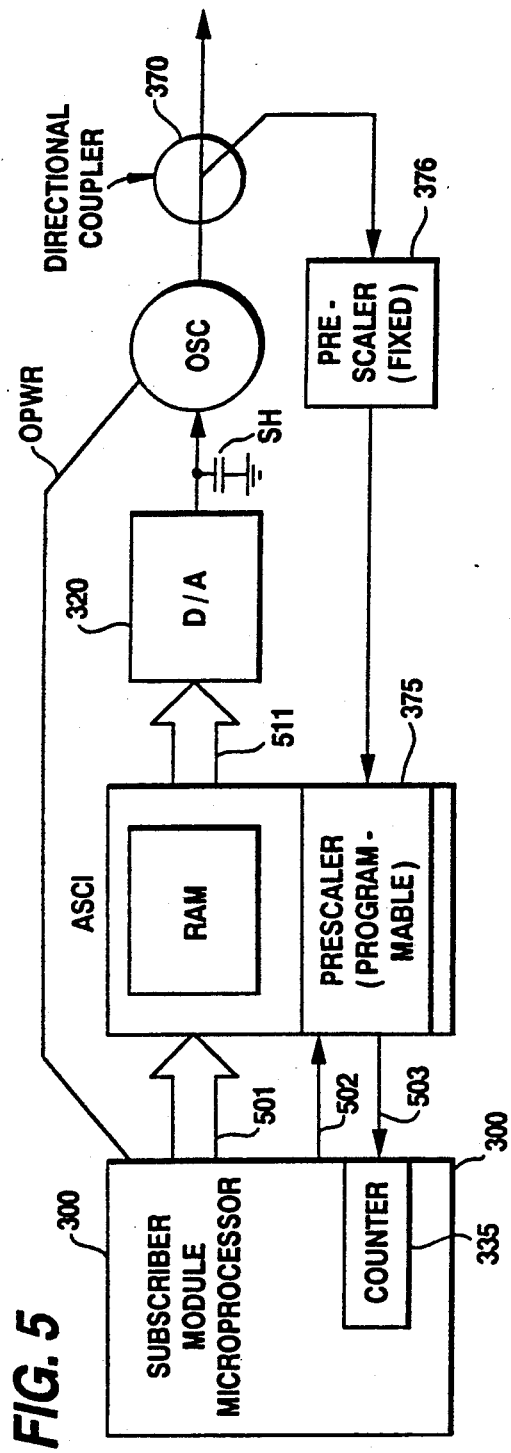
FIG. 5 is a detailed block schematic diagram of one embodiment of a feedback loop structure for implementing the frequency calibration mode of operation of the present invention.

Referring more particularly to FIG. 5, there is shown a block schematic diagram of one embodiment of a feedback loop useful in describing the frequency calibration mode of operation. The frequency calibration mode, occupying a fraction of a second, assures relatively stable operation during a normal mode of operation. Furthermore, because of the frequency calibration mode, there is no requirement for the application of slow conventional frequency locking techniques and a high operation frequency hopping rate of four thousand hertz may be achieved during the normal mode of operation. The embodiment shows the calibration of one particular oscillator OSC. The depicted loop indicates an application specific integrated circuit ASIC connected to subscriber module microprocessor 300. This circuit ASIC may be clocked at twice the microprocessor rate and comprise the previously discussed voltage control word memory RAM as well as programmable prescaler 375. A word adjust and select bus 501 is shown which may separately access and adjust all voltage control words in voltage control word memory RAM. When addressed, the voltage control word memory is connected via bus 511 to digital-to-analog converter 320. Digital-to-analog converter 320 is connected via sample and hold circuit SH to oscillator OSC to which power is applied under microprocessor control via lead OPWR. Via directional coupler 370, the jamming signal output of oscillator OSC is fed back toward microprocessor 300. At fixed prescaler 376, the high frequency output is divided down by a fixed divide-by factor. The divided down jamming frequency output is then output to programmable prescaler 375. Programmable prescaler 375 is under control of microprocessor 300. Responsive to premium channel frequency data transmitted from the headend to microprocessor 260 of FIG. 2, microprocessor 260 in turn generates divide by factor and time between count data for transmittal to microprocessor 300 via the serial peripheral interface bus (FIGS. 2 and 3). Microprocessor 300 programs the divide by factor of programmable prescaler 375 via lead 502 and receives a countable frequency output of programmable prescaler 375 via lead 503. Microprocessor 300 then counts the output at included counter 335.

The provision of application specific integrated circuit ASIC assists in miniaturizing the subscriber module of FIG. 3 and relieves the outboard memory requirements of microprocessor 300. On the other hand, the provision of a limited voltage control word memory in circuit ASIC may restrict the opportunity of microprocessor 300 to reallocate addressable slots to other oscillators when one oscillator is powered down as will be described in greater detail in reference to FIG. 6. The provision of a second or fixed prescaler in comparison with the single programmable prescaler shown in FIG. 3 is desirable if the frequency range of the television spectrum to be jammed extends into the hyperband.

Figure 6:
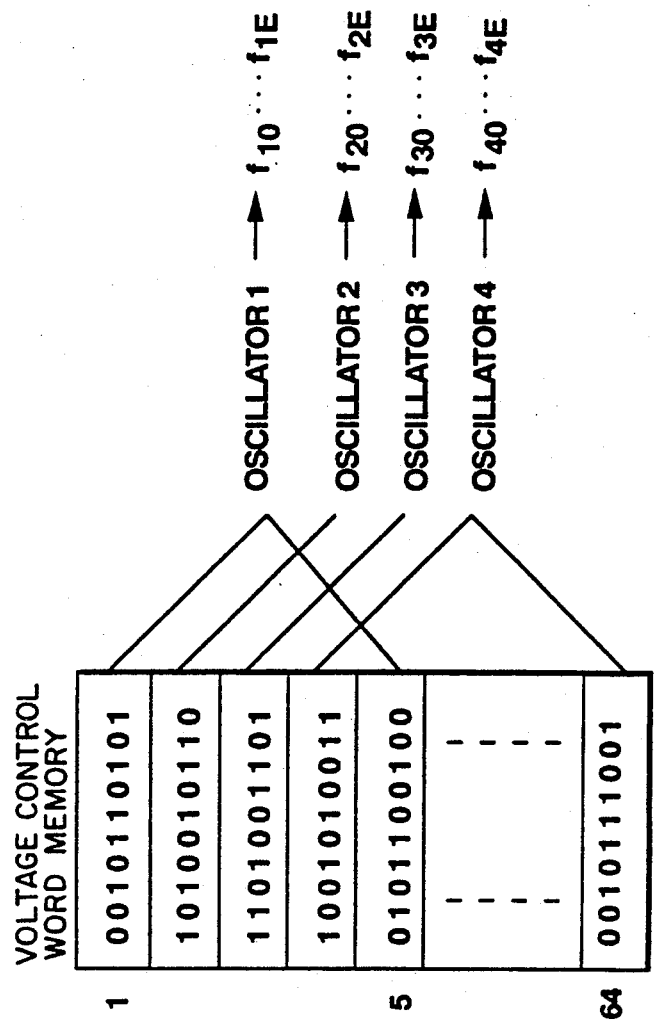
FIG. 6 is a block diagram of the voltage control word memory in connection with the sequential provision of oscillator jamming frequency signal outputs during a normal mode of operation.

Referring now to FIG. 6, there is shown one embodiment of a voltage control word memory having sixty-four memory locations with addresses 1-64. At every fourth memory location 1, 5, 9 and so on is located a voltage control word associated with a first oscillator. For the convenience of establishing a convention for discussion, f10. . . F1E will be assumed to refer to sixteen frequency control words for a first oscillator OSC1 and are numbered in hexadecimal notation from O-E. As indicated above in reference to circuit ASIC memory requirements, the sixteen memory slots may be permanently associated with oscillator OSC1; however, such a design choice limits the freedom of reallocating voltage control words to other oscillators.

Voltage control words are entered into voltage control word memory for each oscillator in sequence provided the oscillator will be applied for jamming. First, it will be assumed that all four oscillators will be applied, each for jamming four premium channels. As will be seen, this is a simplified assumption which assumes a subscriber is authorized to receive no premium channels and, furthermore, it will be assumed that all premium channels are to be jammed at the same jam factor four.

In this example, sixteen voltage control words will be entered in memory for each oscillator, four of which control words may be the same, each four similar control words being related to one premium channel frequency to be jammed. Thus, four groups of four similar control words are entered into sixteen memory locations 1, 5, 9, 13. . . 61 for oscillator OSC1. These are indicated as f10 to f1E. In a similar manner, sixteen voltage control words are entered into memory locations 2, 6, 10, 14. . .62 for oscillator OSC2. These are indicated as f20. . .f2E. Then, sixteen voltage control words are entered into memory locations 3, 7, 11, 15. . .63 for oscillator OSC3, indicated as f30. . .f3E. Lastly, sixteen voltage control words are entered into memory locations 4, 8, 12, 16. . .64 for oscillator OSC4, indicated as f40. . .f4E.

The calibration algorithm for loading a first ten bit voltage control word f1O into a first memory location 1 for a first oscillator OSC1 will now be described in some detail. From the down-loaded frequency data from microprocessor 260, a first programmable divide-by factor is transmitted via lead 502 to set programmable prescaler 375. All other oscillators OSC2-4 are powered down via leads OPWR2-4, and oscillator OSC1 is powered up via lead OPWR1 (shown in FIG. 5 as oscillator OSC and lead OPWR respectively).

From the premium channel frequency data, a first ten bit voltage control word f1O is stored in memory location 1 representing a first best estimate of jamming frequency by microprocessor 300 via bus 501. The word is transmitted to digital-to-analog converter 320 where it is converted to an analog voltage. The analog multiplexer (not shown in FIG. 5) selects a lead FREQ1 from the multiplexer to oscillator OSC1. Consequently, the analog voltage output of the digital to analog converter is provided to sample and hold circuit SH or 337 for application to oscillator OSC1. Signal combiner 365 (not shown in FIG. 5 for simplicity) only passes the jamming signal output from oscillator OSC1 to directional coupler 370 because all other oscillators OSC2-4 are powered down at this time. Via directional coupler 370, the jamming signal output is provided to fixed prescaler 376. Fixed prescaler 376 divides down the output frequency of the oscillator OSC1 to a first frequency. According to the divide by factor loaded into programmable prescaler 375, the first frequency output of fixed prescaler 376 is further divided down to a frequency which may be counted by counter 335 of microprocessor 300. Recognizing that the oscillator output frequency may be hundreds of megahertz and the clock for microprocessor 300 runs at only four megahertz, the frequency provided via lead 503 should be sufficiently divided down to the counted with reasonable accuracy. Since the fixed time between counts is known to microprocessor 300 having been downloaded from microprocessor 260, counter 335 counts the frequency input on lead 503. The resulting count is compared with the expected count and the microprocessor adjusts the control word accordingly. As a result, microprocessor 300 repeatedly enters the algorithm until the voltage control word stored in memory as accurately as possible reflects the premium channel frequency to be jammed. Then, this process is repeated four times for four premium channel frequencies to be jammed by the oscillator OSC.

During the process of loading the four premium channel frequencies for a particular oscillator into the voltage control word memory, there are two subordinate schemes by which the four voltage control words for a single premium channel may be intentionally varied In a first subordinate scheme, via headend 100, four different frequencies may be intentionally selected with references to one premium channel. Given a resolution of 50 kilohertz provided by the least significant bit positions of a ten bit voltage control word, the four different frequencies may be selected by headend 100 anywhere within the 250 kilohertz range above the premium channel video carrier for most effective premium channel jamming. In a second subordinate scheme microprocessor 300 may be programmed to intentionally vary the entered voltage control word to be at or about the expected downloaded frequency, for example, at fifty kilohertz about or below the expected frequency. Consequently, if the headend selects only one frequency for a first premium channel, for example, at 200 kilohertz above the video carrier, then voltage control words will be entered into memory equivalent to video carrier plus 150 kilohertz, 200 kilohertz and 250 kilohertz. Both subordinate schemes thwart pirates attempting to notch out the jamming signal frequency which is intentionally varied by these schemes.

Jamming factor is a term related to the loading of the sixteen voltage control words into voltage control word memory for a particular oscillator. A jamming factor is selected for each premium channel and is globally transmitted from the headend. If four premium channels are to be jammed by each of four oscillators OSC1-4 and all are to be jammed at the same jamming interval, each has a jamming factor of four. If a subscriber subscribes to all four premium channels associated with oscillator OSC1, then oscillator OSC1 may be powered down and no voltage control words entered in memory during calibration for this oscillator. If a subscriber subscribes to two of the four channels, the microprocessor may allocate the sixteen control words for the first oscillator to the two unauthorized premium channel frequencies to be jammed. Consequently, the microprocessor may allocate eight control words each to jamming the two unauthorized premium channels thus automatically increasing the jamming interval or depth of jamming based on the jamming factor and the given reduced level of premium program authorization. Jamming factor may be intentionally selected, for example, at a high level, for example, eight for one especially sensitive program in relation to two other channels to be jammed by the same oscillator which may be allocated jam factors of four each, the total of all such jam factors being equal to the maximum number of voltage control words, in this example, sixteen associated with the oscillator.

Voltage control words may be read from memory or written into memory so they may be read out in a particular pseudo random sequence so that a pirate would have to know the pseudorandom sequence in order to appropriately time any notch filtering. For example, let f11-f14 be the four premium channel frequencies to be jammed by oscillator OSC1. Addresses 1, 5, 9, and 13 may store voltage control words for f11, f12, f13 and f14, respectively. However, the next four addresses 17, 21, 25 and 29 may store the voltage control words in a different order, for example, f14, f13, f12, f11 respectively. The order may be further varied in the remaining eight addresses so, when the voltage control words are applied to oscillator OSC1 during a normal mode of operation, the output frequency of the jamming signal will vary according to the pseudorandom sequence of data entry.

The calibration mode is entered at initial turn-on to generate the sixty-four voltage control words for storage in voltage control word memory corresponding to the desired jamming signal frequencies. Periodically, the subscriber module reenters the calibration mode to update the control words for drift which may result from either the oscillator or the digital to analog converter operation. Such drift if maintained within, for example, 50 kilohertz of the selected frequency is actually desirable in that it further complicates the efforts of a would-be pirate. Also, as already indicated the periodically performed calibration mode permits a higher rate of frequency hopping, for example, four kilohertz during normal operation than would be possible with conventional frequency control methods such as phase locked loops. Calibration requires but a fraction of a second and, consequently, no intelligible television information may be obtained at a television receiver tuned to a unauthorized premium channel.

Figure 7:
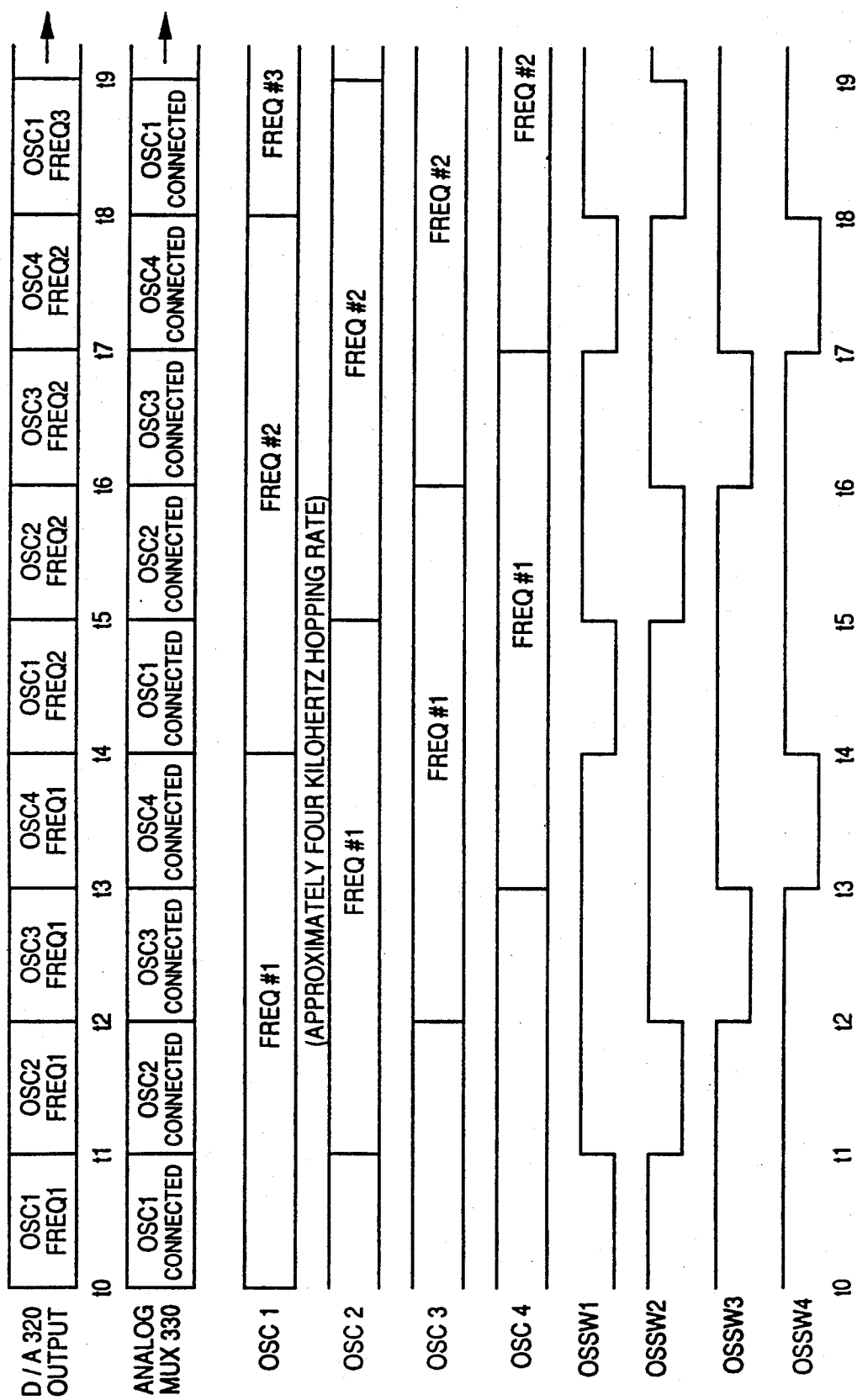
FIG. 7 is a timing diagram for the embodiment of FIG. 3 during a normal mode of operation in which each interdiction control signal is particularly depicted.

Referring now more particularly to FIGS. 6 and 7 with reference to the schematic block diagram of FIG. 3, the normal mode of operation will now be explained. Referring first to FIG. 3, microprocessor 300 upon entering a normal mode of operation causes a first voltage control word stored in memory address 1 of the voltage control word memory of FIG. 6 to be transmitted toward oscillator OSC1. Digital to analog converter 320 converts the ten bit word 0010110101 to an analog voltage level. Under control of a two bit select bus, analog multiplexer 330 selects lead FREQ1 for transmitting the analog voltage signal for storage and holding at sample and hold circuit 337. All four oscillators are presumed to be powered for this example under control of microprocessor 300 via leads OPWR1-4. Consequently, powered-up oscillator OSC1 provides a jamming signal frequency output FREQ2 consistent with the analog voltage signal input provided via analog multiplexer 330.

Referring to FIG. 7, the normal mode of operation for the example under discussion is shown in the form of a timing diagram. At the output of the digital to analog converter is shown at time t0 an analog voltage level representing frequency FREQ1 for oscillator OSC1. Also, during time interval t0-t1, the analog multiplexer 330 is shown connecting the digital to analog converter 320 to oscillator OSC1. While the analog multiplexer is only connected to oscillator OSC1 for the duration t0-t1, the applied analog voltage is stored and held for the duration t0-t4. Consequently, the output of oscillator OSC1 is shown continuously applied from time t0-t4.

Under control of microprocessor 300 via lead OSSW1, switch 361 is briefly opened while frequency FREQ1 is established at the output of oscillator OSC1 and then immediately closed. Switch 361 stays closed for the duration until the output of oscillator OSC1 hops from frequency FREQ1 to FREQ2. Just prior to time t4, switch 361 is again opened in accordance with signal OSSW1. Consequently at the output of switch 361, the jamming signal output of oscillator 341 is briefly interrupted.

At time t4, the digital to analog converter 320 is signaled to change the output frequency of oscillator OSC1 to frequency FREQ2. As before, the analog multiplexer 330 gates an analog voltage level, this time representing frequency FREQ2 to be held at sample and hold circuit 337. As a result, oscillator OSC2 now provides a jamming signal frequency output consistent with frequency FREQ2 until time t8.

Meanwhile, switch 361 which was opened shortly before time t4 in accordance with switch control signal OSSW1 is again closed at a point in time shortly after time t4. At any point in time during a normal mode of operation when one of the high frequency switches 361-364 is opened, there will result a loss of a portion of the overall jamming interval during which a jamming signal would be applied. Nevertheless, the resulting danger of the presence of no switches 361-364 is that during a hopping from one frequency to the next, an undesirable transition signal may result at a frequency and level which may distort authorized premium programming. If four premium program channel frequencies are to be jammed by a particular oscillator, each such period of an open state of a normally closed high frequency switch 361-364 amounts to no more than 5% of the overall interval t0-t64 (not shown).

In a similar manner, a first frequency FREQ1 is established for oscillator OSC2. Referring again to FIG. 6, it will be seen that at memory address 2 is voltage control word 1010010110 which is provided toward oscillator OSC2. In accordance with FIG. 7, at time t1 an analog voltage level is output from digital to analog converter 320 representing this word. At a time just prior to time t1, switch 362 is opened in accordance with signal OSSW2. Once frequency FREQ1 is established at the output of oscillator OSC2 or at a time just after time t1, switch 362 is again closed in accordance with signal OSSW2 provided by microprocessor 300.

As the normal mode of operation continues, all sixty-four memory locations shown in FIG. 6 are periodically addressed and provided for operating oscillators OSC1-4. In accordance with FIG. 7, only the first seven words are represented as having been provided for selecting the first three frequencies for oscillator OSC1 and two frequencies each for oscillators OSC2-4; however, the process for controlling all sixteen frequencies for each oscillator may follow in the sequence shown or intentionally vary.

In order to thwart pirates and referring to FIG. 7 for oscillator OSC1, it may be seen how frequencies may be output in a pseudorandom sequence. Output frequencies FREQ1, FREQ2, FREQ3, FREQ4 are shown output in intervals t0-t4, t4-t8, t8-t12, and inferentially, t12-t16 respectively. In the next intervals, the frequencies may be provided, instead, in the sequence FREQ4, FREQ3, FREQ2 and FREQ1. Then, in the next successive intervals the frequencies may be provided in yet a third different sequence, for example, FREQ2, FREQ3, FREQ4, FREQ1. During the last four successive intervals extending from t48 to t64, the order of applied frequencies may be altered again, for example, FREQ3, FREQ4, FREQ1, FREQ2. The pseudorandom sequence may be defined and downloaded from the headend or developed internally by either microprocessor 260 of FIG. 2 or microprocessor 300 of FIG. 3.

Figure 8:
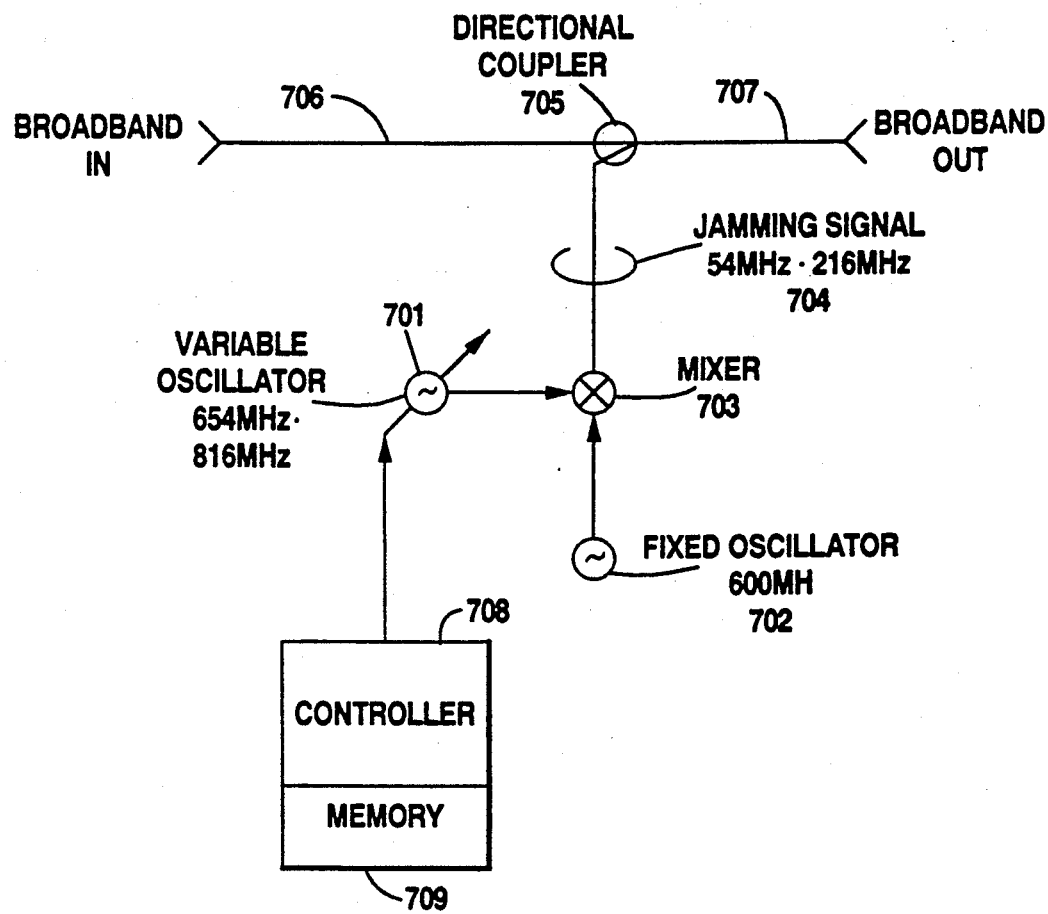
FIG. 8 is a detailed block schematic diagram of one embodiment of an oscillator for an interdiction system using heterodyning techniques.

Referring now to FIG. 8, an oscillator for an interdiction system is shown which moves the frequency of a variable oscillator out of the television band and mixes the variable oscillator output with a fixed local oscillator output to produce a jamming signal that falls in the television band. The technique of this embodiment permits a single jamming oscillator to cover a much higher range of frequencies than is covered by oscillators 341-344 disclosed above with reference to FIG. 3.

Jamming oscillator 701 oscillates at a frequency in the range of 654 MHz to 816 MHz, for example. The output of variable oscillator 701 is then heterodyned with the output of fixed oscillator 702 in mixer 703. Fixed oscillator 702 operates at a frequency of 600 MHz, for example, to produce a jamming signal output 704 that falls within the cable television band (54 MHz to 216 MHz, in this example). The output of mixer 703 is coupled in directional coupler 705 with broadband signal 706 to produce broadband output 707.

This technique permits a single jamming oscillator to cover a much higher range of frequencies than the technique using a single oscillator to directly jam the television frequencies. Another benefit derived from this technique is that nay harmonics of the jamming oscillator and harmonics of the fixed local oscillator lie far above the television band. Therefore, minimal filtering will be necessary in order to remove harmonic affects.

Controller 708 controls the frequency of variable oscillator 701. Controller 708 may be the same microprocessor, microprocessor 300, applied for frequency calibration during a frequency calibration mode of operation described above in connection with FIG. 5. Variable oscillator 701 (such as oscillators 341-344 in FIG. 3) under the control of controller 708 can hop between several frequencies to jam more than one channel. Furthermore, a PIN switch (such as switches 361-364 in FIG. 3) can be inserted between oscillator 701 and mixer 703 or between mixer 703 and directional coupler 705 to blank the output of the oscillator as the oscillator frequency is switched or "hopped" between frequencies. Additionally, it may be desirable to have a plurality of oscillators connected in parallel to the input of mixer 703. The plurality of oscillators can be multiplexed as are oscillators 341-344 and switches 361-364 disclosed above with reference to FIG. 3.

Controller 708 preferably is a microprocessor associated with a particular subscriber module and communicating with microprocessor 260 of FIG. 2 over a serial peripheral interface bus. The microprocessor may be an 8-bit microprocessor equipped with about 2 kilobytes of code and a memory.

A variable attenuator can be inserted in the oscillator of FIG. 8 so that a controller, preferably controller 708, can adjust the attenuation of the oscillator to match it with the magnitude of the broadband signal. Such an attenuator would best inserted between fixed oscillator 702 and mixer 703, although the variable attenuator would also operate inserted between variable oscillator 701 and mixer 703 or between mixer 703 and directional coupler 705. Such an attenuator will later be described with reference to FIG. 10.

Figure 9:
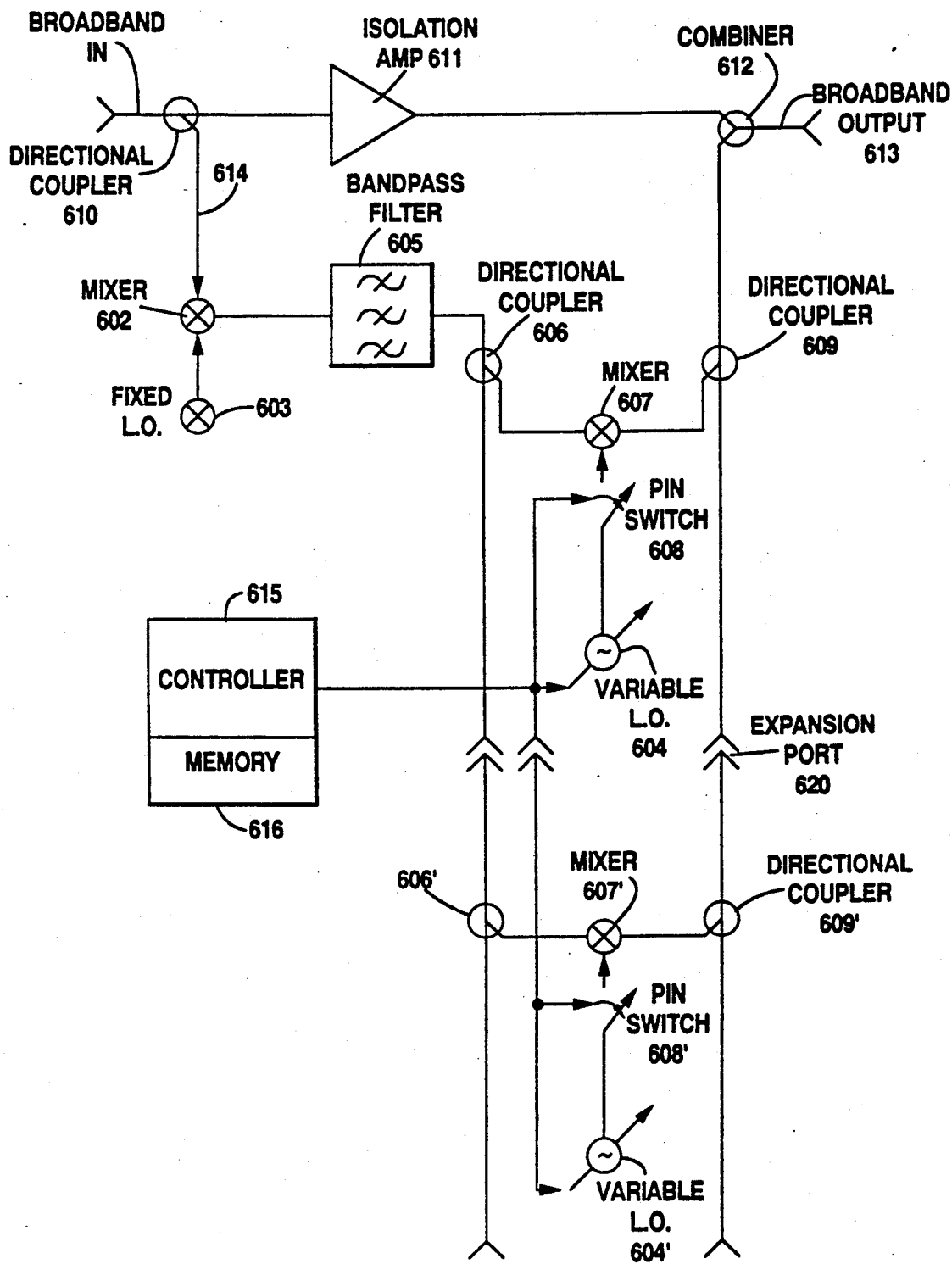
FIG. 9 is a detailed block schematic diagram of one embodiment of an oscillator for the interdiction system with gain control using heterodyning techniques.

Referring now to FIG. 9, an oscillator with gain control using heterodyning techniques for an interdiction system is disclosed. The oscillator in this embodiment uses one channel of a broadband input signal as a jamming signal. This achieves a better gain match between the jamming signal and the picture carried. A channel of the broadband signal used as a jamming signal is first separated out by mixing in a mixer with a fixed frequency output of a local oscillator. The separated out channel is then mixed with the output of one of a plurality of variable local oscillators for interdiction to jam a premium television channel on a broadband signal. The frequency of each variable local oscillator is adjusted to determine the channel jammed and additional local oscillators can be added via expansion ports to jam additional channels.

The oscillator of FIG. 9 achieves a match between the jamming signal and the picture carrier thus effectively providing automatic gain control. Jamming oscillators usually operate near the picture carrier frequency of the television signal and preferably at an amplitude near the amplitude of the television signal. If the amplitude of a jamming oscillator is too low with respect to the amplitude of the picture carrier, inadequate jamming of the channel may occur resulting in a recoverable picture by the subscriber. On the other hand, if the amplitude of a jamming oscillator is too high with respect to the amplitude of the picture carrier, artifacts may be generated in unsecured adjacent television channels. The embodiment of FIG. 9 eliminates the need for any automatic gain control circuits by mixing one of the channels of the broadband signal and using it as a jamming signal.

The primary path for the broadband signal is from input 601 through the lower-loss path of directional coupler 610, through isolation amplifier 611, through combiner 612, and output of port 613. The broadband signal is also coupled through port output 614 of directional coupler 610 and fed to mixer 602. Mixer 602 can be an active mixer with substantial gain since inner modulation distortion products are not particularly troublesome at this point. Mixer 602 is driven by local oscillator 603. The frequency of local oscillator 603 is chosen so as to mix a particular channel of broadband signal 601 to the intermediate passband frequency of bandpass filter 605. If the frequency of bandpass filter 605 is chosen to be above the television band, then little filtering will be required in the system for images and harmonics of fixed local oscillator 603. Bandpass filter 605 only passes energy at or near the picture carrier frequency bandwidth of the channel mixed to its passband frequency.

The output of bandpass filter 605 is then fed through a coupled port of directional coupler 606 to mixer 607. Mixer 607 is driven by variable local oscillator 604 through PIN switch 608. Variable local oscillator 604 and PIN switch 608 operate in a manner similar to jamming oscillators 341-344 and switches 361-364 as disclosed above with reference to FIG. 3 of the interdiction system. In such a manner, the oscillator hops between several frequencies and the PIN switch blanks the output of the oscillator as the oscillator frequency is changing. The result is that at the output of mixer 607, the filtered channel from bandpass filter 605 is mixed so as to "hop" to the proper frequencies to jam television channels in the broadband path. The output of mixer 607 is coupled through directional coupler 609 and is combined with the broadband signal at combiner 612.

For example, if channel 2 was used as the channel for the jamming signal, bandpass filter 605 could be made as a SAW filter at 600 MHz and local oscillator 603 set at 655.25 MHz. A 600 MHz signal at the magnitude of the broadband signal would then be output of bandpass filter 605. Thus, to jam channel 3 in this example, variable local oscillator 604 would be set at 661.75 MHz. The channel 3 frequency (61.75 MHz) at the amplitude of the broadband signal would then be output of mixer 607 (661.75−600 MHz) to jam by interdiction.

In this embodiment, a filtered and mixed television channel performs the jamming as opposed to the output of a free-running oscillator. Consequently, the jamming signal will automatically track variations in level of the incoming broadband signal. This will eliminate the requirement for any automatic gain control circuits while substantially expanding the input dynamic range. This expanded dynamic range will permit operation at very low levels.

Expansion port 620 is used to permit the jamming of additional channels. Variable local oscillator 604', PIN switch 608', mixer 607' and directional couplers 606' and 620' can simply be duplicated. This will permit simultaneous jamming of several channels. It is not necessary to duplicate directional coupler 610, mixer 602, fixed local oscillator 603 and bandpass filter 605 as the same filtered television channel can be used to jam several channels simultaneously on the broadband path. Having a plurality of variable local oscillators via expansion ports, variable local oscillators 604 and 604' can operate simultaneously or be switched in a multiplexed manner as disclosed above with reference to FIG. 3. Furthermore, frequency hopping can be used on one or more of the variable local oscillators to jam more than one television channel.

It should also be noted that the control of variable local oscillators 604 and 604' is performed by controller 615. Controller 615 can be associated with a particular subscriber module and communicate with microprocessor 260 of FIG. 2. Controller 615 is preferably a microprocessor with a memory which may comprise an 8-bit microprocessor equipped with about 2 kilobytes of code.

Frequency control of fixed local oscillator 603 can be accomplished using a crystal controlled oscillator, a SAW filter, a phaselocked loop or any other conventional technique including the calibration mode of frequency control described above.

Bandpass filter 605 must pass energy at frequencies below or preferably above the frequency band of the broadband signal. The picture carrier of the channel that will be used as the jamming signal mixed in mixer 602 with the output of local oscillator 603 must be passed in bandpass filter 605 while sufficiently attenuating energy at frequencies removed from the frequency band of the broadband signal. A coupled resinator SAW filter or similar structure will perform adequately.

Figure 10:
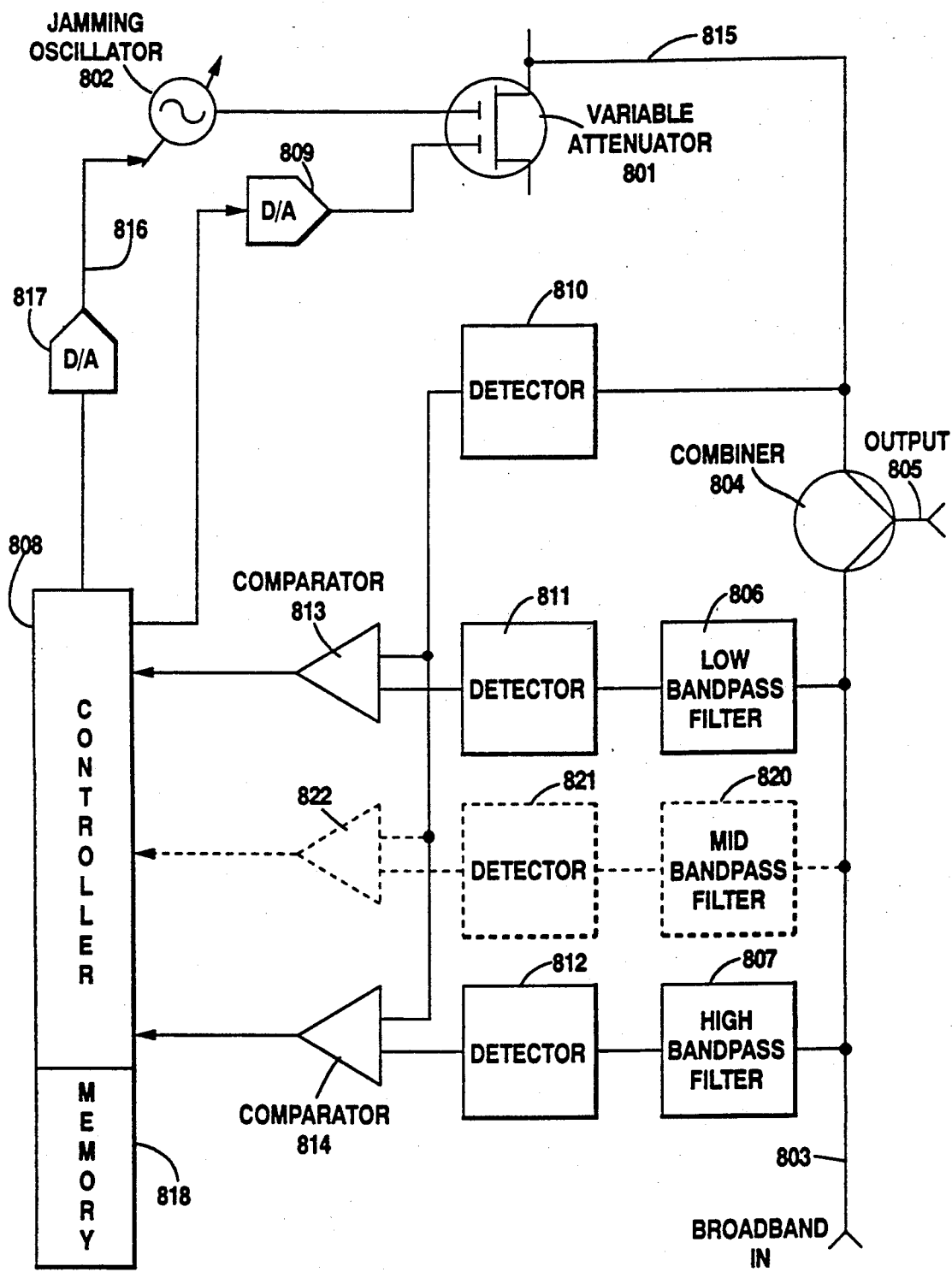
FIG. 10 is a detailed block schematic diagram of one embodiment of microprocessor-controlled automatic gain control for an interdiction system.

Referring now to FIG. 10, an embodiment is disclosed for controlling the attenuation level provided by variable attenuator 801 to attenuate the output of jamming oscillator 802 so that it is matched with the magnitude of broadband signal 803 combined in combiner 804 to be output to a subscriber at 805. The gain control of FIG. 10 senses the attenuated output of a jamming oscillator and a broadband signal input at both a low and high frequency using low bandpass filter 806 and high bandpass filter 807. Controller 808 varies the attenuation on the output of jamming oscillator 802 by variable attenuator 801 in accordance with the frequency of jamming oscillator 802 and in accordance with a stored gain function determined during an attenuation calibration mode. During the attenuation calibration mode, the attenuated output of jamming oscillator 802 is compared with the broadband high and low frequency signals to determine the gain function by interpolation between the high frequency and low frequency gains.

To obtain an even better interpolated gain function, additional inputs may be provided, for example, at a midband frequency through mid bandpass filter 820 or a plurality of other predetermined frequencies.

An attenuation calibration mode similar to the frequency calibration routine described above in conjunction with FIG. 5 adjusts the level of the jamming signal to maintain a match between the broadband video carrier and the jamming signal. The output of jamming oscillator is passed through variable attenuator 801. Variable attenuator 801 is an electrically variable attenuator such as a dual-gate field effect transistor. The amount of attenuation is determined by an attenuation control signal sent from controller 808 via digital-to-analog (D/A) converter 809. Digital-to-analog converter 809 may be the same digital-to-analog converter as digital-to-analog converter 320 of FIG. 5 having separate outputs for gain and frequency control of variable attenuator 801 and oscillator OSC respectively.

The attenuation calibration mode to determine the gain function is performed at periodic intervals during operation or upon initial power-up. Furthermore, the periodic interval can be adjusted by downloading a command transmitted from the headend. For example, a global or addressed command may be transmitted over a separate data carrier specifying the interval at twice per day. During attenuation calibration mode, jamming oscillator 802 is set to its lowest jamming frequency. Variable attenuator 801 is adjusted by controller 808 via digital-to-analog converter 809 to its minimum attenuation of the jamming signal output of oscillator 802. Controller 808 then compares the level output of variable attenuator 801 to the level of the video carrier at the low end of the jamming band by means of low bandpass filter 806, detector 811 and comparator 813. Controller 808 then raises the level of the jamming signal by raising the attenuation of variable attenuator 801 via the control signal through digital-to-analog converter 809. The attenuation level of variable attenuator 801 is raised until it reaches the point where comparator 813 will trip. At this point attenuated jamming signal 815 and video carrier 803 are properly matched in level and the attenuation necessary for this low frequency is stored in memory 818. Next, the output of jamming oscillator 802 is moved to the highest frequency to be jammed in accordance with the control signal on control line 816 from controller 808. The process is then repeated using high bandpass filter 807, detector 812 and comparator 814 and the attenuation necessary for this high frequency is stored in memory 818. Thus, comparator 808 can match the levels of jamming oscillator 802 and video carrier broadband input 803 at the upper and lower ends of the band. To complete calibration, simple interpolation can then performed by controller 808 between the upper and lower ends of the band to determine the gain curve for controlling the proper attenuation level at frequencies in between the upper and lower ends of the band. The interpolation can be performed while in calibration mode with the interpolated results stored in memory 818 or the interpolation can be performed later during normal, free-running operation.

The interpolation performed between the upper and lower ends of the band can be a straight line interpolation or a simple cable slope interpolation. More than the upper and lower end of the band such as a plurality of various midband frequencies can also be taken to improve the interpolation accuracy if additional hardware such as mid bandpass filter 820 are used. The interpolation can also be performed by curve fitting a known characteristic curve representative of the attenuation over frequency of the interdiction system. The known characteristic curve can be positioned between the upper and lower ends of the band. Furthermore, the predetermined function can be downloaded via a command specifically addressed to the present interdiction apparatus from the headend as an alternative to calibrating by interpolation. Further, the characteristic curve itself can be downloaded from the headend for curve fitting by interpolation. The predetermined function determined by interpolation or downloaded can be stored in memory as a lookup table.

During normal, free-running operation controller 808 can continuously adjust the attenuation of variable attenuator 808 based on the stored calibration results according to the frequency of jamming oscillator 802 during frequency hopping in the same manner as jamming oscillator 802 is frequency controlled by its controller or, alternatively, by the same controller 808 via analog-to-digital converter 817 along control line 816.

The gain control of the embodiments of FIGS. 9 and 10 are desirable because not only do they compensate for drifts of the jammin oscillator gain with respect to the broadband signal gain due to temperature drifts and seasonal weather changes, but they also automatically adjust the gain of the jamming signal with respect to the broadband input signal magnitude when placed at any location in a CATV plant. Depending upon the location of the jamming interdiction device in the CATV plant, power levels can vary up to 20 decibels (dB). The gain control of FIGS. 9 and 10 use the magnitude of the broadband input signal as a reference for adjusting the magnitude of the jamming signal so that the magnitude of the jamming signal can be perfectly matched to the magnitude of the broadband input signal for off-premises cable television interdiction.

Furthermore, these gain control circuits and methods, especially that of FIG. 10, can be used for gain control other than in cable television interdiction. For example, the gain control of FIG. 10 can be used to control amplitude of a cable television signal booster amplifier in such a way as to have no amplitude tilt due to frequency variations along the frequency band. Furthermore, the gain control of FIG. 10 can be used as an automatic reference gain control in telephone communication or digital data communication systems.

Additionally, the above disclosed interdiction method and apparatus is not limited to jamming premium channel transmissions over coaxial cable. Interdiction of transmission over alternative mediums to coaxial cable such as fiber optic cable or over-the-air radio frequency transmission can easily be accomplished. This is especially possible for those fiber optic cable television arrangements operating over approximately the same RF television bands as conventional coaxial cable CATV distribution systems.

What is claimed is:

1. A television premium channel interdiction apparatus for selectively jamming unauthorized premium programming on a broadband signal transmitted to a subscriber comprising:
   first oscillator means for outputting a first signal at a first predetermined frequency;
   first mixer means for mixing the broadband signal with the first signal and outputting a second signal comprising the first signal mixed with at least one channel of the broadband signal;
   bandpass filter means for filtering the second signal and outputting a third signal, said bandpass filter having a passband offset above or below the television band of the broadband signal;
   second oscillator means for outputting a fourth signal at a variable frequency;
   second mixer means for mixing the third signal with the fourth signal and outputting a fifth signal; and
   combiner means for combining the broadband signal with the fifth signal so as to selectively jam at least one channel of the broadband signal.

2. The television premium channel interdiction apparatus of claim 1, further comprising:
   controller means, coupled to said second oscillator means, for controlling a frequency of said second oscillator means to selectively jam a particular channel.

3. The television premium channel interdiction apparatus of claim 2, wherein said controller means controls said second oscillator means to periodically jam a plurality of channels by frequency hopping.

4. The television premium channel interdiction apparatus of claim 3, wherein:
   said second oscillator means further comprises:
      a plurality of oscillators coupled to said controller means and said mixer means, said controller means controlling a frequency of each of said plurality of oscillators; and
   said second mixer means further comprises:
      a plurality of mixers, each of said plurality of mixers coupled to a corresponding one of said plurality of oscillators.

5. The television premium channel interdiction apparatus of claim 4, further comprising:
   at least one switching means coupled to said plurality of oscillators, said plurality of mixers, and controller means, wherein said controller means controls a connection of each of said plurality of oscillators to one of said plurality of mixers by said at least one switching means.

6. The television premium channel interdiction apparatus of claim 5, wherein said controller means controls said at least one switching means so that said plurality of oscillators, when each tuned to jam a particular channel can selectively be coupled to one of said plurality of mixers and selectively jam a particular channel when said at least one switching means is closed.

7. The television premium channel interdiction apparatus of claim 1, wherein a frequency of the first signal output from said first oscillator is chosen so as to mix a particular channel of the broadband signal to a passband frequency of said bandpass filter means.

8. The television premium channel interdiction apparatus of claim 1, further comprising:
   isolation amplifier means, coupled to said second mixer means and said combiner means for amplifying the broadband signal prior to combining the broadband signal with the fifth signal.

9. Interdiction oscillator apparatus for use in a television premium channel interdiction system for selectively jamming unauthorized premium programming on a broadband signal transmitted to a subscriber comprising:
   first oscillator means for oscillating at a fixed frequency and outputting a first signal;
   second oscillator means for oscillating at a variable frequency and outputting a second signal;
   mixer means for mixing the first and second signals and outputting a third signal;
   coupler means for coupling the third signal with the broadband signal to selectively jam a particular channel transmitted to the subscriber; and
   controller means for controlling a frequency of said second oscillator means to a certain frequency to selectively jam a particular channel transmitted to the subscriber,
wherein said second oscillator oscillates at a frequency out of a television band in a range of about 654 MHz to 816 MHz and the second signal is heterodyned with the first signal at about 600 MHz to produce a jamming signal that falls in a television band of about 54 MHz to 216 MHz.

10. Interdiction oscillator apparatus for use in a television premium channel interdiction system for selectively jamming unauthorized premium programming on a broadband signal transmitted to a subscriber comprising:
   first oscillator means for oscillating at a fixed frequency and outputting a first signal;
   second oscillator means for oscillating at a variable frequency and outputting a second signal;
   mixer means for mixing the first and second signals and outputting a third signal;
   coupler means for coupling the third signal with the broadband signal to selectively jam a particular channel transmitted to the subscriber;
   controller means for controlling a frequency of said second oscillator means to a certain frequency to selectively jam a particular channel transmitted to the subscriber; and
   a plurality of variable oscillators connected in parallel with one another, outputs of said plurality of variable oscillators coupled to an input to said mixer means, said controller means controlling a frequency of each of said plurality of variable oscillators to selectively jam a particular channel.

11. The interdiction oscillator apparatus of claim 10, further comprising:
switching means coupled to each of said plurality of variable oscillators and an input to said mixer means, said controller means controlling said switching means.

12. Gain control apparatus for use in a television premium channel interdiction system for selectively jamming unauthorized premium programs on a broadband signal transmitted to a subscriber, comprising:
jamming oscillator means for generating a jamming signal;
variable attenuator means for attenuating the jamming signal in accordance with a control signal to produce an attenuated jamming signal;
combiner means for combining the attenuated jamming signal with the broadband signal to produce a jammed signal;
first comparator means for comparing a magnitude of the attenuated jamming signal with the broadband signal; and
controller means for determining and providing the control signal to said variable attenuator means in accordance with a predetermined function of a frequency of said jamming oscillator.

13. The gain control apparatus of claim 12, wherein said controller means provides the control signal to said variable attenuator to decrease attenuation when the attenuated jamming signal effectively has a magnitude greater than the broadband signal determined from the predetermined function of a frequency of said jamming oscillator means and increase attenuation when the attenuated jamming signal effectively has a magnitude less than the broadband signal determined from a function of a frequency of said jamming oscillator.

14. The gain control apparatus of claim 12, further comprising:
first detector means for detecting a magnitude of the attenuated jamming signal and outputting a first signal; and
second detector means for detecting a magnitude of the broadband signal at a first frequency and outputting a second signal;
wherein said first comparator means compares a magnitude of the attenuated jamming signal and the broadband signal in response to the first signal and the second signal.

15. The gain control apparatus of claim 14, wherein said second detector means comprises a bandpass filter.

16. The gain control apparatus of claim 14, further comprising:
third detector means for detecting a magnitude of the broadband signal at a second frequency and outputting a third signal; and
second comparator means for comparing a magnitude of the attenuated jamming signal with the broadband signal in response to the first signal and the third signal;
wherein said second detector means comprises a low frequency bandpass filter and said third detector means comprises a high frequency bandpass filter.

17. The gain control apparatus of claim 16, wherein said controller means provides the control signal to said variable attenuator means in accordance with a frequency of said jamming oscillator using a predetermined function stored in memory.

18. The gain control apparatus of claim 17, wherein the predetermined function is stored in a calibration mode as a lookup table with values representing attenuation in locations indicative of frequencies of the jamming oscillator.

19. The gain control apparatus of claim 17, wherein the predetermined function stored in memory is determined by interpolation, the interpolation performed between results of a comparison of the magnitude of the attenuated jamming signal with the magnitude of the broadband signal in said first comparator means and a comparison of the magnitude of the attenuated jamming signal with the magnitude of the broadband signal in said second comparator means.

20. The gain control apparatus of claim 19, wherein said controller performs a calibration routine comprising the steps of:
measuring high and low frequency gain; and
interpolating between the high and low frequency gain to determine the predetermined function.

21. The gain control apparatus of claim 19, wherein the interpolation is a straight line approximation.

22. The gain control apparatus of claim 19, wherein the interpolation is a simple cable slope interpolation.

23. The gain control apparatus of claim 17, wherein the predetermined function is a known characteristic curve representative of attenuation over frequency of an interdiction system transmission medium.

24. The gain control apparatus of claim 23, wherein ends of the known characteristic curve are positioned between a required gain determined by a comparison in said first comparator means and a required gain determined by a comparison in said second comparator means.

25. The gain control apparatus of claim 23, wherein the characteristic curve is downloaded to said controller from a headend.

26. The gain control apparatus of claim 17, further comprising:
fourth detector means for detecting a magnitude of the broadband signal at a third frequency; and
third comparator means for comparing a magnitude of the attenuated jamming signal with the broadband signal, in response to said first detector means and said fourth detector means;
wherein said fourth detector means further comprises a mid frequency bandpass filter.

27. The gain control apparatus of claim 26, wherein the predetermined function stored in memory is determined by interpolation, the interpolation performed between required gains determined by a comparison in said first comparator, said second comparator and said third comparator.

28. A television premium channel interdiction apparatus for selectively jamming unauthorized premium programming transmitted to a subscriber comprising:
a plurality of controlled oscillators for separately interdicting within allocated portions of a broadband cable television spectrum, the sum of all allocated portions comprising the total spectrum to be jammed, the allocated portions of the spectrum selected such that jamming signal frequency harmonic interference may be alleviated by a filter means, and
microprocessor actuation and control means, responsive to an addressed communication from a headend, for selectively actuating and controlling plurality of n jamming frequencies provided by said plurality of oscillators, n being greater than or equal to four,
wherein the allocated portion for each of said plurality of controlled oscillators are chosen from at least the following portions:
  a first portion comprising lowband channels two through five,
  a second portion comprising midband channels fourteen through twenty-two,
  a third portion comprising channels nineteen through twenty-two and highband channels seven through ten,
  a fourth portion comprising highband channels eleven through thirteen and superband channels twenty-three through twenty-nine, and
  a fifth portion comprising superband channels thirty into the hyperband through channel forty-one.

29. A television premium channel interdiction apparatus for selectively jamming unauthorized premium programming transmitted on a broadband signal comprising:
  at least one variable frequency oscillator for interdicting a jamming signal;
  storage means, for storing frequency calibration values of said at least one variable frequency oscillator; and
  controller means, coupled to said at least one variable frequency oscillator and said storage means, for addressing each of said at least one variable frequency oscillator to control a frequency of each of said at least one variable frequency oscillator in accordance with the stored frequency calibration values.

30. The television premium channel interdiction apparatus of claim 29, wherein said controller means determines the stored frequency calibration values based on a frequency output of each of said at least one variable frequency oscillator when each of said at least one variable frequency oscillator is addressed.

31. The television premium channel interdiction apparatus of claim 30, further comprising:
  prescaler means responsive to an output of each of said at least one variable frequency oscillator;
  counter means responsive to the output of said prescaler means, wherein said controller means is responsive to said counter means for detecting a frequency of each of said at least one variable frequency oscillator; and
  digital-to-analog converter means for addressing each of said at least one variable frequency oscillator by said controller means.

32. The television premium channel interdiction apparatus of claim 29, further comprising:
  variable attenuator means for attenuating the jamming signal, wherein said controller means further controls said variable attenuation means in accordance with previously stored attenuation calibration values.

33. The television premium channel interdiction apparatus of claim 32, wherein
  said controller means determines the stored frequency calibration values during a frequency calibration routine based on a frequency output of each of said at least one variable frequency oscillator when each of said at least one variable frequency oscillator is addressed, and
  said controller means determines attenuation calibration values during an attenuation calibration routine based on a magnitude of an attenuated jamming signal and a magnitude of the broadband signal.

34. The television premium channel interdiction apparatus of claim 33, wherein the frequency calibration routine and the attenuation calibration routine are performed upon power-up.

35. The television premium channel interdiction apparatus of claim 33, wherein the frequency calibration routine or the attenuation calibration routine are performed at variable sequential intervals during operation of the interdiction apparatus.

36. The television premium channel interdiction apparatus of claim 35, wherein the variable sequential intervals are controlled by downloading from a headend.

37. The television premium channel interdiction apparatus of claim 32, wherein the attenuation calibration values are previously stored by downloading to said controller means from a headend.

38. The television premium channel interdiction apparatus of claim 29, wherein the stored frequency calibration values are previously stored by downloading to said controller means from a headend.

39. A television premium channel interdiction method for selectively jamming unauthorized premium programming on a broadband signal transmitted to a subscriber comprising the steps of:
  generating a predetermined frequency signal;
  mixing the broadband signal with the predetermined frequency signal so as to mix a certain channel of the broadband signal and outputting a first mixed signal;
  filtering the first mixed signal with a passband offset above or below a television band of the broadband signal and outputting a filtered signal;
  generating a variable frequency signal;
  mixing the filtered signal with the variable frequency signal and outputting a second mixed signal; and
  combining the broadband signal with the second mixed signal so as to selectively jam a particular channel.

40. The television premium channel interdiction method of claim 39, further comprising the step of:
  controlling the generated variable frequency signal to selectively jam a particular channel.

41. The television premium channel interdiction method of claim 40, further comprising the step of:
  frequency hopping the variable frequency signal to periodically jam a plurality of channels.

42. The television premium channel interdiction method of claim 41, further comprising the step of:
  switching the variable frequency signal prior to mixing.

43. An interdiction system for use in a television premium channel interdiction system for selectively jamming unauthorized premium programming on a broadband signal transmitted to a subscriber comprising the steps of:
  generating a fixed frequency signal;
  generating a variable frequency signal;
  controlling the variable frequency signal;
  mixing the fixed frequency signal and the variable frequency signal to produce a mixed frequency signal;

coupling the mixed frequency signal and the variable frequency signal with the broadband signal to selectively jam a particular channel transmitted to the subscriber;

frequency hopping the variable frequency signal between particular frequencies to jam premium programming on particular channels, wherein the variable frequency signal is out of a television band in a range of about 654 MHz to 816 MHz and is heterodyned with the fixed frequency signal at about 600 MHz to produce a jamming signal that falls in a television band of about 54 MHz to 216 MHz.

44. The interdiction method according to claim 43, further comprising the step of:

switching the variable frequency signal before mixing.

45. A television premium channel interdiction gain control method for use in an interdiction apparatus for selectively jamming unauthorized premium programs on a broadband signal transmitted to a subscriber, comprising the steps of:

generating a jamming signal at a jamming frequency;

variably attenuating the jamming signal to produce an attenuated jamming signal;

combining the attenuated jamming signal with the broadband signal to produce a jammed signal;

comparing a magnitude of the attenuated jamming signal with the broadband signal; and determining and providing control of attenuation in accordance with a predetermined function of the jamming frequency.

46. The gain control method of claim 45, wherein the step of providing control includes the step of decreasing attenuation when the attenuated jamming signal effectively has a magnitude greater than the broadband signal determined from the predetermined function of the jamming frequency and increasing attenuation when the attenuated jamming signal effectively has a magnitude less than the broadband signal determined from a function of the jamming frequency.

47. The gain control method of claim 45, further comprising the steps of:

detecting an attenuated magnitude of the attenuated jamming signal;

detecting a magnitude of the broadband signal at a first frequency; and comparing the attenuated magnitude of the attenuated jamming signal and the magnitude of the broadband signal.

48. The gain control method of claim 47, wherein the step of detecting a magnitude of the broadband signal at a first frequency comprises bandpass filtering.

49. The gain control method of claim 47, further comprising the steps of:

detecting a magnitude of the broadband signal at a second frequency; and comparing the attenuated magnitude of the attenuated jamming signal with the broadband signal in response to the detected magnitude of the broadband signal at the first and second frequencies;

wherein the step of detecting a magnitude of the broadband signal at a first frequency comprises low frequency bandpass filtering and the step of detecting a magnitude of the broadband signal at a second frequency comprises high frequency bandpass filtering.

50. The gain control method of claim 49, further comprising the step of:

controlling attenuation of the jamming signal in accordance with the jamming frequency using a predetermined function.

51. The gain control method of claim 50, further comprising the step of:

interpolating to determine the predetermined function using an interpolation performed between results of comparing the attenuated jamming signal and the broadband signal and of comparing the attenuated jamming signal with the broadband signal at the first frequency.

52. The gain control method of claim 51, further comprising the step of:

storing the predetermined function.

53. The gain control method of claim 52, wherein the predetermined function is stored as a lookup table with values representing attenuation as a function of jamming signal frequencies.

54. The gain control method of claim 51, wherein the interpolation is a straight line interpolation.

55. The gain control method of claim 51, wherein the interpolation is a simple cable slope interpolation.

56. The gain control method of claim 49, further comprising the step of:

curve fitting the ends of a known characteristic curve determined by results of comparing the attenuated jamming signal and the broadband signal at the first frequency and of comparing the attenuated jamming signal with the broadband signal at the second frequency.

57. The gain control method of claim 45, further comprising the step of:

downloading from a headend a known characteristic curve representative of an attenuation over frequency of a transmission medium for said interdiction apparatus.

58. A television premium channel interdiction method for selectively jamming unauthorized premium programming transmitted from a headend to a subscriber on a broadband signal comprising the steps of:

assigning a particular interdiction device to at least one subscriber;

transmitting a plurality of channels on a broadband signal in the clear from the headend to a plurality of subscribers;

transmitting a command signal to an interdiction device to jam a particular channel of the broadband signal;

generating a fixed frequency signal;

generating a variable frequency signal;

mixing the fixed frequency signal with the variable frequency signal to produce a mixed signal; and coupling the mixed signal with the broadband signal to selectively jam the particular channel transmitted from the headend to the subscriber.

59. The television premium channel interdiction method of claim 58, further comprising the step of:

commanding an interdiction device to control the frequency of the variable frequency signal to selectively hop between particular frequencies to jam premium programming on a particular channel.

60. A television premium channel interdiction method for selectively jamming unauthorized premium programming transmitted from a headend to a subscriber on a broadband signal comprising the steps of:

assigning a particular interdiction device to at least one subscriber;

transmitting a plurality of channels on a broadband signal in the clear from the headend to a plurality of subscribers;

transmitting a command signal to an interdiction device to jam a particular channel of the broadband signal;

generating a predetermined frequency signal;

mixing the broadband signal with the predetermined frequency signal so as to mix a certain channel of the broadband signal and to produce a first mixed signal;

filtering the first mixed signal with a passband offset above or below a television band of the broadband signal and producing a filtered signal;

generating a variable frequency signal;

mixing the filtered signal with the variable frequency signal to produce a second mixed signal; and combining the broadband signal with the second mixed signal so as to selectively jam a particular channel transmitted from the headend to a subscriber.

61. The television premium channel interdiction method of claim 60, further comprising the step of:

controlling the variable frequency signal to selectively jam a particular channel.

62. A television premium channel interdiction method for selectively jamming unauthorized premium programming transmitted from a headend over a medium on a broadband signal comprising the steps of:

assigning a particular interdiction device to at least one subscriber;

transmitting a plurality of channels on a broadband signal in the clear from the headend to a plurality of subscribers;

transmitting a command signal to an interdiction device to jam a particular channel of the broadband signal;

generating a jamming signal;

variably attenuating the jamming signal to produce an attenuated jamming signal;

combining the attenuated jamming signal with the broadband signal so as to selectively jam a particular channel transmitted from the headend to a subscriber;

comparing the magnitude of the attenuated jamming signal with the broadband signal; and determining and providing control for variable attenuation of the jamming signal in accordance with a predetermined function of a jamming signal frequency.

63. The television premium channel interdiction method of claim 62, wherein control is provided by decreasing attenuation when the attenuated jamming signal effectively has a magnitude greater that the broadband signal determined from the predetermined function of the jamming frequency and increasing attenuation when the attenuated jamming signal effectively has a magnitude less than the broadband signal determined from a function of the jamming frequency.

64. The television premium channel interdiction method of claim 62, further comprising the step of:

downloading the predetermined function from the headend.

65. The television premium channel interdiction method of claim 62, further comprising the steps of:

detecting an attenuated magnitude of the attenuated jamming signal;

detecting a magnitude of the broadband signal at a first frequency;

comparing the attenuated magnitude of the attenuated jamming signal and the magnitude of the broadband signal at the first frequency;

detecting the magnitude of the broadband signal at a second frequency;

comparing the magnitude of the attenuated jamming signal with the broadband signal at the second frequency;

wherein said step of detecting the magnitude of the broadband signal at the first frequency comprises low frequency bandpass filtering and said step of detecting the magnitude of the broadband signal at the second frequency comprises high frequency bandpass filtering.

66. The television premium channel interdiction method of claim 65, further comprising the step of:

interpolating to determine the predetermined function using an interpolation performed between results of comparing the magnitude of the attenuated jamming signal and the magnitude of the broadband signal at the first frequency and of comparing the magnitude of the attenuated jamming signal and the magnitude of the broadband signal at the second frequency.

67. The television premium channel interdiction method of claim 66, further comprising the step of:

storing the predetermined function.

68. The television premium channel interdiction method of claim 66, wherein the predetermined function is stored as a lookup table with values representing attenuation as a function of frequencies of the jamming signal.

69. The television premium channel interdiction method of claim 66, wherein the interpolation is a straight line interpolation.

70. The television premium channel interdiction method of claim 66, wherein the interpolation is a simple cable slope interpolation.

71. The television premium channel interdiction method of claim 65, wherein the step of determining the predetermined function comprises:

curve fitting ends of a known characteristic curve from results of comparing the magnitude of the attenuated jamming signal with the broadband signal at a first frequency and comparing the magnitude of the attenuated jamming signal with the broadband signal at a second frequency.

72. The television premium channel interdiction method of claim 62, wherein a frequency calibration routine to determine frequency calibration values or an attenuation calibration routine to determine the predetermined function are performed at periodic intervals.

73. The television premium channel interdiction method of claim 72, wherein the frequency calibration values are previously stored by downloading from the headend.

74. The television premium channel interdiction method of claim 72, wherein the predetermined function is previously stored by downloading to a controller from the headend.

75. The television premium channel interdiction method of claim 72, wherein the periodic intervals are downloaded from the headend.

76. The television premium channel interdiction method of claim 62, further comprising the step of:

downloading from the headend a known characteristic curve for the medium representative of attenuation versus frequency.

* * * * *